US008577152B2

(12) United States Patent  (10) Patent No.: US 8,577,152 B2
Zhang et al.  (45) Date of Patent: Nov. 5, 2013

(54) METHOD OF AND APPARATUS FOR CLASSIFYING IMAGE

(75) Inventors: Lun Zhang, Beijing (CN); Weiguo Wu, Beijing (CN)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 13/040,912

(22) Filed: Mar. 4, 2011

(65) Prior Publication Data

US 2011/0216978 A1  Sep. 8, 2011

(30) Foreign Application Priority Data

Mar. 5, 2010  (CN) .......................... 2010 1 0120003

(51) Int. Cl.
*G06K 9/46* (2006.01)
(52) U.S. Cl.
USPC ........... 382/195; 382/155; 382/159; 382/181; 382/190; 382/224
(58) Field of Classification Search
USPC .................. 382/155, 159, 181, 190, 195, 224
See application file for complete search history.

(56) References Cited

U.S. PATENT DOCUMENTS

| 7,587,069 B2* | 9/2009 | Movellan et al. ............. 382/118 |
| 2006/0204103 A1* | 9/2006 | Mita et al. ..................... 382/190 |
| 2007/0160266 A1* | 7/2007 | Jones et al. ................... 382/117 |
| 2010/0226578 A1* | 9/2010 | Kokojima ..................... 382/195 |
| 2011/0135192 A1* | 6/2011 | Yokono ......................... 382/160 |

OTHER PUBLICATIONS

Takeshi Mita, Toshimitsu Kaneko, Osamu Hori, "Joint Haar-like Features for Face Detection", IEEE International Conference on Computer Vision, vol. 2, 2005, pp. 1619-1626.*

* cited by examiner

*Primary Examiner* — Eric Rush
(74) *Attorney, Agent, or Firm* — Oblon, Spivak, McClelland, Maier & Neustadt, L.L.P.

(57) ABSTRACT

A method and apparatus that classify an image. The method extracts a feature vector from the image, wherein the feature vector includes a plurality of first features. The extracting of each of the first features includes: acquiring a difference between sums or mean values of pixels of the plurality of first areas in the corresponding combination to obtain a first difference vector in the direction of the first axis, and obtaining a second difference vector in the direction of the second axis. A first projection difference vector is acquired with a second projection difference vector. A sum of magnitudes of the first projection difference vector and the second projection difference vector as the first feature is obtained; and the image according to the extracted feature vector is classified.

16 Claims, 11 Drawing Sheets

METHOD OF AND APPARATUS FOR CLASSIFYING IMAGE

FIELD OF THE INVENTION

The present invention relates to classifying videos or an images (determining whether objects are contained or not), i.e., detecting or recognizing objects in videos or images, and especially to a method of and an apparatus for generating a classifier for discriminating whether objects to be detected are contained in the videos or images, and a method of and an apparatus for classifying the images with the generated classifier.

BACKGROUND OF THE INVENTION

As widely spreading of applications such as video monitoring, artificial intelligence, computer vision or the like, there are increasing demands for techniques of detecting specific objects such as human, animal, vehicle or the like presenting in videos and images. Among methods of detecting objects in videos or images, there is a kind of methods where static image features are employed to create classifiers for discriminating whether objects or non-objects are contained in the videos or images, thereby employing the classifiers to classify the images, i.e., detecting objects in the images, whereas for the videos, the detecting is performed by regarding each frame as an image.

One of such techniques has been disclosed in Paul Viola and Michael Jones, "Robust Real-time Object Detection", Second International Workshop On Statistical And Computational Theories Of Vision—Modeling, Learning, Computing, And Sampling, Vancouver, Canada, Jul. 13, 2001. In the technique of Paul Viola et al., differences between pixel sums of rectangular blocks are extracted from images as features, features which are more suitable for discriminating object and non-objects are selected from the extracted features to form weak classifiers through the AdaBoost method, and the weak classifiers are merged to form a strong classifier. This kind of method are suitable for detecting objects such as human face from images, and their robustnesss in detecting objects such as human is not high.

SUMMARY OF THE INVENTION

In view of the above deficiencies of the prior art, the present invention is intended to provide a method of and an apparatus for generating a classifier, and a method of and an apparatus for classifying images, to increase the robustnesss in detecting objects in the image.

According to one embodiment of the present invention, a method of generating a classifier for discriminating object images from non-object images includes: extracting a feature vector from an input image, wherein the feature vector comprises a plurality of first candidate features, each of the first candidate features corresponds to a candidate combination of a plurality of first areas arranged in the direction of a first axis, a plurality of second areas arranged in the direction of a second axis intersecting with the direction of the first axis, and one of a plurality of predetermined orientations, and the extracting of each of the first candidate features comprises: acquiring a difference between sums or mean values of pixels of the plurality of first areas in the corresponding candidate combination to obtain a first difference vector in the direction of the first axis, and acquiring a difference between sums or mean values of pixels of the plurality of second areas in the corresponding candidate combination to obtain a second difference vector in the direction of the second axis; acquiring a first projection difference vector and a second projection difference vector projected by the first difference vector and the second difference vector on the line of the predetermined orientation in the corresponding candidate combination; and acquiring the sum of magnitudes of the first projection difference vector and the second projection difference vector as the first candidate feature; and training the classifier according to the extracted feature vectors.

According to another embodiment of the present invention, an apparatus for generating a classifier for discriminating object images from non-object images is provided. The apparatus extracts a feature vector from the input image, wherein the feature vector comprises a plurality of first candidate features, each of the first candidate features corresponds to a candidate combination of a plurality of first areas arranged in the direction of a first axis, a plurality of second areas arranged in the direction of a second axis intersecting with the direction of the first axis, and one of a plurality of predetermined orientations, and the apparatus includes: a difference calculating unit which with respect to each of the first candidate features, acquires a difference between sums or mean values of pixels of the plurality of first areas in the corresponding candidate combination to obtain a first difference vector in the direction of the first axis, acquires a difference between sums or mean values of pixels of the plurality of second areas in the corresponding candidate combination to obtain a second difference vector in the direction of the second axis, and acquires a first projection difference vector and a second projection difference vector projected by the first difference vector and the second difference vector on the line of the predetermined orientation in the corresponding candidate combination;

and a feature calculating unit which acquires the sum of magnitudes of the first projection difference vector and the second projection difference vector as the first candidate feature; and a training unit which trains the classifier according to the extracted feature vectors.

According to the above embodiments of the present invention, the first difference vector and the second difference vector are calculated based on pixels of regions arranged in two directions respectively, so that the extracted features can reflect the distribution of object edges in respective in portions more truly. Further, by assuming various possible local edge orientations of objects through using different predetermined orientations, it is able to further increase the robustnesss of the classifier.

Further, in the above method and apparatus, the feature vector may further comprise at least one second candidate feature, wherein each of the second candidate feature corresponds to at least two candidate combinations of a plurality of first areas arranged in the direction of the first axis, a plurality of second areas arranged in the direction of the second axis intersecting with the direction of the first axis, and one of a plurality of predetermined orientations. The extracting of each second candidate feature may comprise: with respect to each of the at least two candidate combinations corresponding to each of the second candidate feature, acquiring a difference between sums or mean values of pixels of the plurality of first areas in the candidate combination to obtain a first difference vector in the direction of the first axis, and acquiring a difference between sums or mean values of pixels of the plurality of second areas in the candidate combination to obtain a second difference vector in the direction of the second axis; acquiring a first projection difference vector and a second projection difference vector projected by the first difference vector and the second difference vector on the line of the predetermined orientation in the candidate combination; and acquiring the sum of magnitudes of the first projection difference vector and the second projection difference vector; and acquiring the mean value or sum of the sums corresponding to the at least two candidate combinations as the second candidate feature.

According to the above embodiments of the present invention, the feature corresponding to each candidate combination characterizes an object edge, and the features corresponding to at least two candidate combinations are combined so as to be able to obtain a single feature for characterizing at least two object edges, thereby facilitating to train a more robust classifier.

In the above methods and apparatuses, the areas may be rectangular, wherein the first areas are adjoined, and the second areas are adjoined too.

In the above methods and apparatuses, in case that the numbers of the first areas and of the second areas are two, the first areas are adjoined and the second areas are adjoined, the intersection of the first axis and the second axis locates on a connecting line for adjoining the first areas or within a predetermined range from a connecting point for adjoining the first areas, and locates on a connecting line for adjoining the second areas or within a predetermined range from a connecting point for adjoining the second areas.

In the above methods and apparatuses, in case that the numbers of the first areas and of the second areas are two, the first areas are spaced apart and the second areas are spaced apart spaced apart, the intersection of the first axis and the second axis locates within a predetermined range from the middle point between respective center positions of the first areas, and locates within a predetermined range from the middle point between respective center positions of the second areas.

In the above methods and apparatuses, in case that the numbers of the first areas and of the second areas are three, the intersection of the first axis and the second axis locates respectively in the intermediate one of the first areas and in the intermediate one of the second areas.

In the above methods and apparatuses, the difference between the at least two combinations comprises one or more of the followings: relative positional relation of the areas, number of the areas, shape of the areas, size of the areas and aspect ratio of the areas. This can rich the features in consideration, thereby facilitate to select features suitable for discriminating objects and non-objects.

In the above methods and apparatuses, the angles of the plurality of predetermined orientations relative to the first axis or the second axis may range from 0 degree to 180 degree or from 0 degree to 360 degree.

In the above methods and apparatuses, the angles between adjacent predetermined orientations of the plurality of predetermined orientations may be the same.

In the above methods and apparatuses, at least one set may be generated according to candidate combinations corresponding to the first candidate features, wherein each set includes at least two candidate combinations. It is possible to evaluate discriminating capability of the second candidate feature by acquiring the second candidate feature corresponding to each set through the following manner: with respect to each candidate combination in the set, acquiring a difference between sums or mean values of pixels of the plurality of first areas in the candidate combination to obtain a first difference vector in the direction of the first axis, and acquiring a difference between sums or mean values of pixels of the plurality of second areas in the candidate combination to obtain a second difference vector in the direction of the second axis; acquiring a first projection difference vector and a second projection difference vector projected by the first difference vector and the second difference vector on the line of the predetermined orientation in the candidate combination; and acquiring the sum of magnitudes of the first projection difference vector and the second projection difference vector; and acquiring the mean value or sum of the sums corresponding to the candidate combinations of the set as the second candidate feature. The set may be excluded from the searched set if the discriminating capability of the second candidate feature does not meet a predetermined requirement. Afterwards, the candidate combinations in each of the set may be regarded as candidate combinations corresponding to one of the second candidate feature.

According to another embodiment of the present invention, a method of classifying an image includes: extracting a feature vector from the image, wherein the feature vector comprises a plurality of first features, each of the first features corresponds to a combination of a plurality of first areas arranged in the direction of a first axis, a plurality of second areas arranged in the direction of a second axis intersecting with the direction of the first axis, and one of a plurality of predetermined orientations, and the extracting of each of the first features comprises: acquiring a difference between sums or mean values of pixels of the plurality of first areas in the corresponding combination to obtain a first difference vector in the direction of the first axis, and acquiring a difference between sums or mean values of pixels of the plurality of second areas in the corresponding combination to obtain a second difference vector in the direction of the second axis; acquiring a first projection difference vector and a second projection difference vector projected by the first difference vector and the second difference vector on the line of the predetermined orientation in the corresponding combination; and acquiring the sum of magnitudes of the first projection difference vector and the second projection difference vector as the first feature; and classifying the image according to the extracted feature vector.

According to another embodiment of the present invention, an apparatus for classifying an image is provided. The apparatus extracts a feature vector from the image, wherein the feature vector comprises a plurality of first features, each of the first features corresponds to a combination of a plurality of first areas arranged in the direction of a first axis, a plurality of second areas arranged in the direction of a second axis intersecting with the direction of the first axis, and one of a plurality of predetermined orientations, and the apparatus includes: a difference calculating unit which with respect to each of the first features, acquires a difference between sums or mean values of pixels of the plurality of first areas in the corresponding combination to obtain a first difference vector in the direction of the first axis, acquires a difference between sums or mean values of pixels of the plurality of second areas in the corresponding combination to obtain a second difference vector in the direction of the second axis, and acquires a first projection difference vector and a second projection difference vector projected by the first difference vector and the second difference vector on the line of the predetermined orientation in the corresponding combination; and a feature calculating unit which acquires the sum of magnitudes of the first projection difference vector and the second projection difference vector as the first feature; and a classifying unit which classifies the image according to the extracted feature vector.

According to the above embodiments of the present invention, the first difference vector and the second difference vector are calculated based on pixels of regions arranged in two directions respectively, so that the extracted features can reflect the distribution of object edges in respective in portions more truly. Further, by assuming various possible local edge orientations of objects through using different predetermined orientations, it is able to obtained features with more strong discriminating capability, thereby increasing the robustnesss of the classifier.

In the above method and apparatus, the feature vector may further comprise at least one second feature, wherein each of the second feature corresponds to at least two combinations of a plurality of first areas arranged in the direction of the first axis, a plurality of second areas arranged in the direction of the second axis intersecting with the direction of the first axis, and one of a plurality of predetermined orientations. The extracting of each second feature may comprise: with respect to each of the at least two combinations corresponding to each of the second feature, acquiring a difference between sums or mean values of pixels of the plurality of first areas in the corresponding combination to obtain a first difference vector in the direction of the first axis, and acquiring a difference between sums or mean values of pixels of the plurality of second areas in the corresponding combination to obtain a second difference vector in the direction of the second axis; acquiring a first projection difference vector and a second projection difference vector projected by the first difference vector and the second difference vector on the line of the predetermined orientation in the corresponding combination; and acquiring the sum of magnitudes of the first projection difference vector and the second projection difference vector; and acquiring the mean value or sum of the sums corresponding to the at least two combinations as the second feature.

According to the above embodiments of the present invention, the feature corresponding to each candidate combination characterizes an object edge, and the features corresponding to at least two candidate combinations are combined so as to be able to obtain a single feature for characterizing at least two object edges, thereby increasing the discriminating capability of features and facilitating to train a more robust classifier.

In the above methods and apparatuses, the areas may be rectangular, wherein the first areas are adjoined, and the second areas are adjoined too.

In the above methods and apparatuses, in case that the numbers of the first areas and of the second areas are two, the first areas are adjoined and the second areas are adjoined, the intersection of the first axis and the second axis locates on a connecting line for adjoining the first areas or within a predetermined range from a connecting point for adjoining the first areas, and locates on a connecting line for adjoining the second areas or within a predetermined range from a connecting point for adjoining the second areas.

In the above methods and apparatuses, in case that the numbers of the first areas and of the second areas are two, the first areas are spaced apart and the second areas are spaced apart, the intersection of the first axis and the second axis locates within a predetermined range from the middle point between respective center positions of the first areas, and locates within a predetermined range from the middle point between respective center positions of the second areas.

In the above methods and apparatuses, in case that the numbers of the first areas and of the second areas are three, the intersection of the first axis and the second axis locates respectively in the intermediate one of the first areas and in the intermediate one of the second areas.

In the above methods and apparatuses, the difference between the at least two combinations comprises one or more of the followings: relative positional relation of the areas, number of the areas, shape of the areas, size of the areas and aspect ratio of the areas. This can rich the features in consideration, thereby facilitate to select features suitable for discriminating objects and non-objects.

In the above methods and apparatuses, the at least two combinations corresponding to each of the second feature can form a sequence where a deviation between the predetermined orientations of adjacent combinations is within a predetermined range, respective coverage of the areas of the adjacent combinations are close to each other, and pixels covered by the at least two combinations are not exactly the same as each other.

In the above methods and apparatuses, the angles of the plurality of predetermined orientations relative to the first axis or the second axis may range from 0 degree to 180 degree or from 0 degree to 360 degree.

In the above methods and apparatuses, the angles between adjacent predetermined orientations of the plurality of predetermined orientations may be the same.

BRIEF DESCRIPTION OF THE DRAWINGS

The above and/or other aspects, features and/or advantages of the present invention will be easily understood in view of the following description by referring to the accompanying drawings. In the accompanying drawings, identical or corresponding technical features or components will be represented with identical or corresponding reference numbers. In the accompanying drawings, it is not necessary to present size and relative position of elements in scale.

DETAILED DESCRIPTION OF THE EMBODIMENTS

Figure 1:
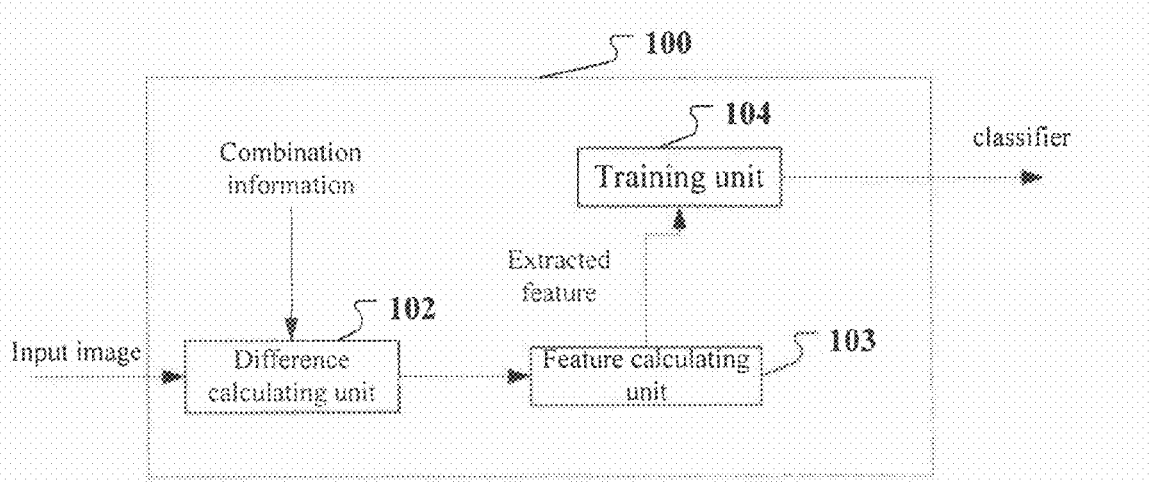
FIG. 1 is a block diagram showing the structure of an apparatus for generating a classifier for discriminating object images and non-object images according to an embodiment of the present invention.

The embodiments of the present invention are below described by referring to the drawings. It is to be noted that, for purpose of clarity, representations and descriptions about those components and processes known by those skilled in the art but unrelated to the present invention are omitted in the drawings and the description.

FIG. 1 is a block diagram showing the structure of an apparatus 100 for generating a classifier for discriminating object images and non-object images according to an embodiment of the present invention.

As shown in FIG. 1, the apparatus 100 comprises a difference calculating unit 102, a feature calculating unit 103 and a training unit 104.

In the technique of employing static image features to create a classifier, object images and non-object images are collected, features are extracted from the collected object images and non-object images, and the extracted features are filtered and merged by using filter methods such as AdaBoost to obtain a classifier for discriminating the object images and non-object images. A method of collecting and preparing such object images and non-object images has been disclosed in patent application WO 2008/151470, Ding et al., "A Robust Human Face Detecting Method In Complicated Background Image" (see page 2 to page 3 of the description). The object images and the non-object images as collected and prepared may serve as input images to the apparatus 100. The apparatus 100 extracts a group of features from each of a plurality of input images as a feature vector. Thus, one feature vector $V_i (f_1, f_2, \ldots, f_n)$ is extracted from each image, and then a classifier is trained according to a set of the extracted vectors.

With respect to the feature vector of a respective image, the feature in each of dimensions of the feature vector is calculated based on pixels of one or more portions of the respective image. In the embodiments of the present invention, features are determined by areas and orientations of the features. The pixels on which the calculation of each feature is based are defined by a number of pixel areas. For ease of illustrating, the pixel area(s) for defining the pixels on which the calculation of a feature is based is called as feature area(s) for the feature. The Feature area for the features in the same dimension is identical.

It is possible to determine in advance which features are included in the feature vector to be extracted, and to what feature area each of these features corresponds. The feature area of a feature may comprise a plurality of first areas arranged in the direction of a first axis, and a plurality of second areas arranged in the direction of a second axis intersecting (for example, in right angle or in non-right angle) with the direction of the first axis.

The feature area of a feature may be determined in view of two aspects, layout and position. The layout referenced herein comprises relative positional relation of the areas, shape of the areas, size of the areas and aspect ratio of the areas. The layout of the first areas and the second areas may be various. In an example, the weighted mean position of positions of pixels in the plurality of first areas and the weighted mean position of positions of pixels in the plurality of second areas fall within a predetermined range from the intersection of the first axis and the second axis. Specifically, by taking first areas as an example, it is possible to represent positions of pixels in the first areas as $(x_{ij}, y_{ij})$, wherein $x_{ij}$ represents the coordinate of the j-th pixel of the i-th first area on the first axis (for example, X-axis), and $y_{ij}$ represents the coordinate of the j-th pixel of the i-th first area on the second axis (for example, Y-axis). The weighted mean position (xa, ya) of positions of pixels in the first areas may be defined in the following:

$$xa = \sum_{i}^{N} \sum_{l}^{M_i} x_{ij} \times w_i, \quad ya = \sum_{i}^{} \sum_{j}^{M_i} y_{ij} \times w_i,$$

wherein N is the number of the first areas, $M_i$ is the number of pixels in the i-th first area, $w_i$ is the weight of the i-th first area, and $$\sum_{i}^{N} w_i = 1.$$

Further or alternatively, in the above example, the weights of all the first areas may be identical, or may be at least in part different. In case of different weights, it is possible to allocate smaller weights to first areas including more pixels, and allocate larger weights to first areas including less pixels.

Although descriptions have been provided by taking first areas as an example in the above, the above description is also applicable to second areas.

In another example, the areas may be rectangular, wherein the first areas are adjoined, and the second areas are adjoined too.

FIG. 2 is a schematic diagram showing examples of layout of the feature area for a feature. In FIG. 2, X-axis represents the first axis, Y-axis represents the second axis, and white color and black color in rectangular blocks are only for clarifying purpose. Although the first axis and the second axis in FIG. 2 are shown as orthogonal to each other, the first axis and the second axis may also intersect with each other in a non-right angle. Further, directions of the first axis and the second axis may be consistent with the image width direction and the image height direction respectively, or the directions of the second axis and the first axis may be consistent with the image width direction and the image height direction respectively, or the directions of the first axis and the second axis may be that rotated by a predetermined angle, for example, an integer multiple of 45 degree, relative to the image width direction or the image height direction.

According to an area layout, the numbers of the first areas and of the second areas are two, the first areas are adjoined and the second areas are adjoined. According to this layout, the intersection of the first axis and the second axis locates on a connecting line for adjoining the first areas or within a predetermined range from a connecting point (for example, when vertex points of rectangular areas are adjoined) for adjoining the first areas (for example, substantially coinciding with each other), and locates on a connecting line for adjoining the second areas or within a predetermined range from a connecting point for adjoining the second areas.

Figure 2A:
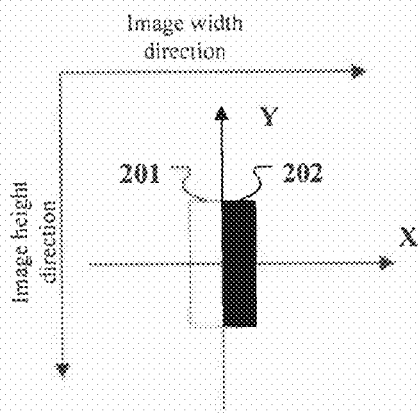
FIG. 2 is a schematic diagram showing examples of layout of areas for a feature.
Figure 2B:
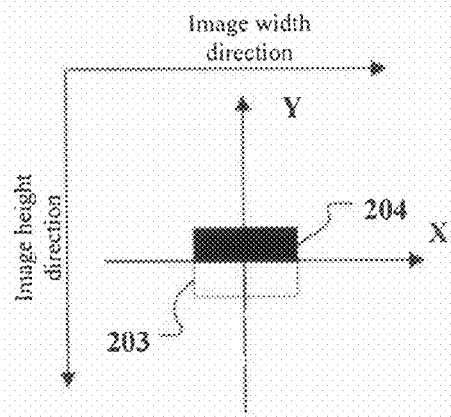

FIG. 2a and FIG. 2b show an example of such an area layout. Specifically, FIG. 2a shows an arrangement of first areas in the direction of the first axis, where each of white rectangular block 201 and black rectangular block 202 represents a first area and they are adjoined on a connecting line, whereas the intersection of the first axis and the second axis locates on the connecting line. FIG. 2b shows an arrangement of second areas in the direction of the second axis, where each of white rectangular block 203 and black rectangular block 204 represents a second area and they are adjoined on a connecting line, whereas the intersection of the first axis and the second axis locates on the connecting line. Although arrangements of areas in the directions of the first axis and the second axis are respectively shown in FIG. 2a and FIG. 2b, what is actually reflected is an area layout when FIG. 2a and FIG. 2b are merged, i.e., the first axis and the second axis of FIG. 2a are respectively identical to the first axis and the second axis of FIG. 2b. Alternatively, the rectangular blocks 201 and 202 as well as rectangular blocks 203 and 204 may be adjoined with each other via respective vertex points.

According to another area layout, the numbers of the first areas and of the second areas are two, the first areas are spaced apart and the second areas are spaced apart. According to this arrangement, the intersection of the first axis and the second axis locates within a predetermined range from the middle point between respective center positions of the first areas, and locates within a predetermined range from the middle point between respective center positions of the second areas.

Figure 2C:
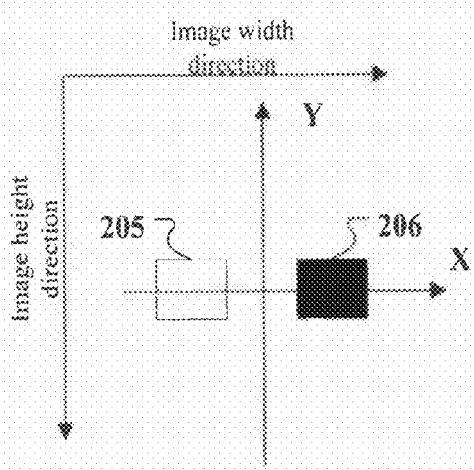
Figure 2D:
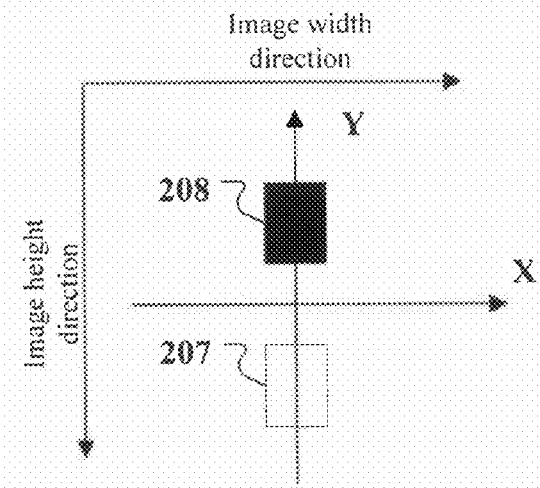

FIG. 2c and FIG. 2d show an example of such an area layout. FIG. 2c shows an arrangement of first areas in the direction of the first axis, where each of white rectangular block 205 and black rectangular block 206 represents a first area and they are spaced apart, whereas the intersection of the first axis and the second axis locates within a predetermined range from the middle point between respective center positions of the white rectangular block 205 and the black rectangular block 206. FIG. 2d shows an arrangement of second areas in the direction of the second axis, where each of white rectangular block 207 and black rectangular block 208 represents a second area and they are spaced apart, whereas the intersection of the first axis and the second axis locates within a predetermined range from the middle point between respective center positions of the white rectangular block 207 and the black rectangular block 208. Although arrangements of areas in the directions of the first axis and the second axis are respectively shown in FIG. 2c and FIG. 2b, what is actually reflected is an area layout when FIG. 2c and FIG. 2d are merged, i.e., the first axis and the second axis of FIG. 2c are respectively identical to the first axis and the second axis of FIG. 2d.

Figure 2E:
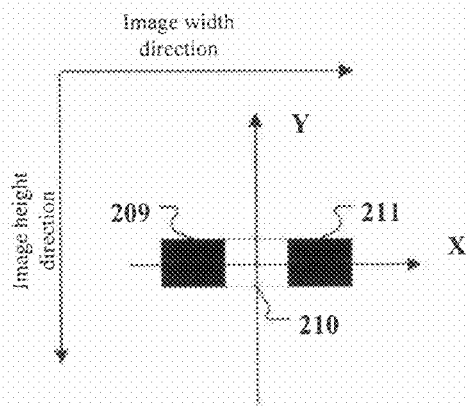
Figure 2F:
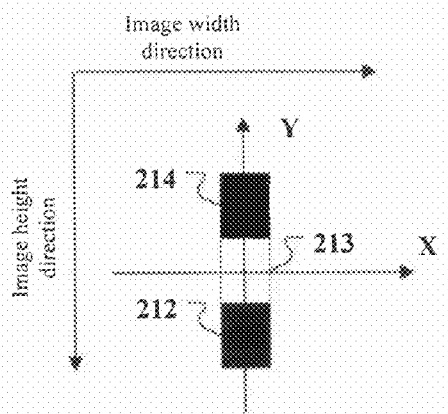
Figure 2G:
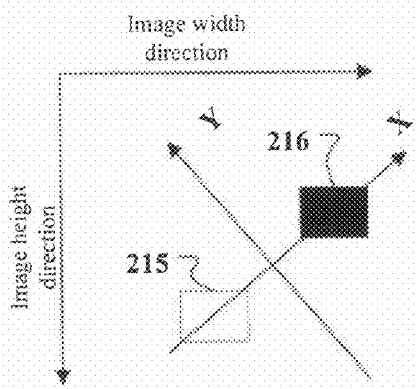
Figure 2H:
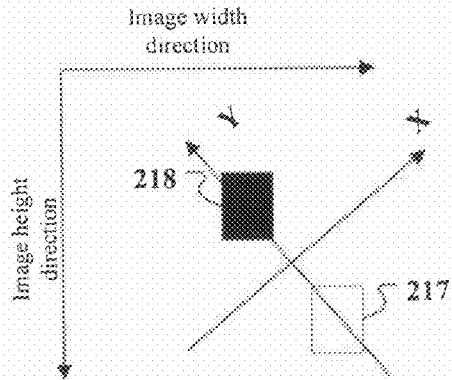

FIG. 2g and FIG. 2h show another example of such an area layout, where rectangular blocks are against to each other at respective vertex points. FIG. 2g shows an arrangement of first areas in the direction of the first axis, where each of white rectangular block 215 and black rectangular block 216 represents a first area and they are spaced apart, whereas the intersection of the first axis and the second axis locates within a predetermined range from the middle point between respective center positions of the white rectangular block 215 and the black rectangular block 216. FIG. 2h shows an arrangement of second areas in the direction of the second axis, where each of white rectangular block 217 and black rectangular block 218 represents a second area and they are spaced apart, whereas the intersection of the first axis and the second axis locates within a predetermined range from the middle point between respective center positions of the white rectangular block 217 and the black rectangular block 218. Although arrangements of areas in the directions of the first axis and the second axis are respectively shown in FIG. 2g and FIG. 2h, what is actually reflected is an area layout when FIG. 2g and FIG. 2h are merged, i.e., the first axis and the second axis of FIG. 2g are respectively identical to the first axis and the second axis of FIG. 2h.

According to another area layout, the numbers of the first areas and of the second areas are three. According to this arrangement, the intersection of the first axis and the second axis locates respectively in the intermediate one of the first areas and in the intermediate one of the second areas.

FIG. 2e and FIG. 2f show an example of such an area layout. FIG. 2e shows an arrangement of first areas in the direction of the first axis, where each of white rectangular block 210 and black rectangular blocks 209, 211 represents a first area and the intersection of the first axis and the second axis locates in the intermediate white rectangular block 210. FIG. 2f shows an arrangement of second areas in the direction of the second axis, where each of white rectangular block 213 and black rectangular blocks 212, 214 represents a second area and the intersection of the first axis and the second axis locates in the intermediate white rectangular block 213. Although arrangements of areas in the directions of the first axis and the second axis are respectively shown in FIG. 2e and FIG. 2f, what is actually reflected is an area layout when FIG. 2e and FIG. 2f are merged, i.e., the first axis and the second axis of FIG. 2e are respectively identical to the first axis and the second axis of FIG. 2f. Alternatively, the rectangular blocks 209, 210 and 211 may be separated apart, instead of being adjoined, and the rectangular blocks 212, 213 and 214 may be separated apart, instead of being adjoined.

It should be noted that, the shape of first areas and second areas is not limited to rectangular, and it may be other shapes such as polygon, triangle, circle, ring, and irregular shapes. The shape of first areas and second areas may also be different, and in the feature area for the same feature, the shape of different first/second areas may also be different.

In addition, in case of rectangular shape, sides of different areas of first areas may be in parallel to each other, or may be rotated by an angle such as an integer multiple of 45 degree relative to each other. Also, in case of rectangular shape, sides of different areas of second areas may be in parallel to each other, or may be rotated by an angle such as an integer multiple of 45 degree relative to each other. In case of rectangular shape, the adjoining of rectangular areas comprises the cases where the rectangular area are adjoined via respective sides (i.e., the intersection of the first axis and the second axis locates on these sides), and the cases where the rectangular areas are adjoined via vertex points of respective corners (i.e., the intersection of the first axis and the second axis locates at these vertex points).

It should also noted that the number of first area arranged in the direction of the first axis and the number of second areas arranged in the direction of the second axis are not limited to the numbers as shown in FIG. 2, and the number of first areas is not necessarily identical to the number of second areas, as long as the weighted mean position of positions of pixels in the first areas and the weighted mean position of positions of pixels in the second areas fall within a predetermined range from the intersection of the first axis and the second axis. Preferably, the number of first areas and the number of second areas are not greater than 3.

It should also noted that in the feature area for the same feature, the relative position relation of first areas and the relative position relation of second areas may be arbitrary. For example, first areas arranged in the direction of the first axis may be adjoined, separated, partly adjoined, and partly separated, second areas arranged in the direction of the second axis may be adjoined, separated, partly adjoined, and partly separated, as long as the weighted mean position of positions of pixels in the first areas and the weighted mean position of positions of pixels in the second areas fall within a predetermined range from the intersection of the first axis and the second axis.

Feature area for features has also a position property which defines positions, in images, of respective first areas and second areas involved in the area layout. The term "position" herein refers to the position of entire area layout in images. The position may be represented with the position, in images, of a point (for example, the geometry center of the feature area) within or external to the entire area layout. With respect to feature areas for different features with the same area layout, the position of the point relative to the feature area is fixed. Feature areas for some features may not completely fall within an image. In this case, it is possible to assign a predetermined value such as zero, or a mean value of all the pixels in the image to pixels of portions outside of the image.

In the collected object images, outline edges of objects present characteristics distinct from that of non-objects. The outline edges of objects in the object images may have various distributions. To be able to extract features enough for reflecting the outline edges of objects, feature areas for different features may involve different area layouts and different positions in the images, to obtain enough characteristics of the outline edges.

Figure 3A:
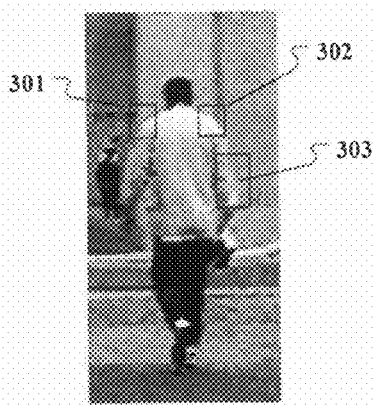
FIG. 3a shows an example of distribution of outline edges of an object (human body).

FIG. 3a shows an example of distribution of outline edges of an object (human body). As shown in FIG. 3a, in the input image, outline edges of human body exist in respective portions with different size and different position, such as portions 301, 302 and 303.

Figure 3B:
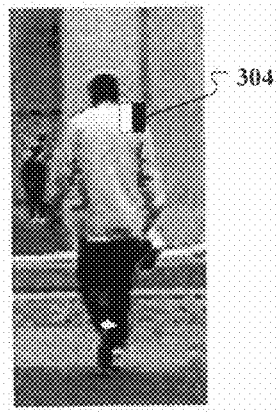
FIGS. 3b and 3c are schematic diagrams respectively showing how to determine first areas and second areas in the portion shown in FIG. 3a based on the area layout shown in FIGS. 2a and 2b.
Figure 3C:
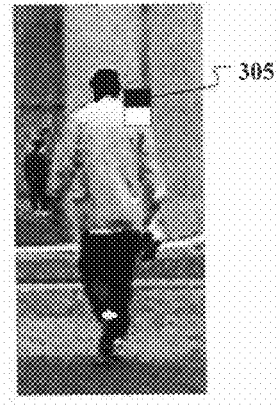

FIGS. 3b and 3c are schematic diagrams respectively showing how to determine first areas and second areas in portion 302 shown in FIG. 3a based on the area layout shown in FIGS. 2a and 2b. In FIG. 3b, reference sign 304 indicates the arrangement of first areas. In FIG. 3c, reference sign 305 indicates the arrangement of second areas.

With respect to the determination of the feature area for each feature of a feature vector, in an embodiment, it is possible to determine first areas and second areas (i.e., feature area) at different positions in the input image based on an area layout. New area layouts are then obtained by changing area size and/or area aspect ratio in this area layout, and first areas and second areas are determined at different positions in the input image based on the new area layouts. This process is repeated until all the possible area sizes or area aspect ratios have been attempted for this area layout.

In addition or alternatively, in the above embodiment, it is possible to obtain new area layouts by changing relative position relation of areas in the area layout.

In addition or alternatively, in the above embodiment, it is possible to obtain new area layouts by changing the number of areas in the area layout.

In addition or alternatively, in the above embodiment, it is possible to obtain new area layouts by changing the shape of areas in the area layout.

First areas and second areas determined based on one position of an area layout in the input image determine the feature area on which one feature to be extracted is based on. In brief, area layouts of feature areas on which at least two features in a feature vector are based are different. For example, differences between different area layouts may comprise one or more of the followings: relative positional relation of the areas, number of the areas, shape of the areas, size of the areas and aspect ratio of the areas.

First areas and second areas of each feature area substantially cover a portion at a certain position in the image. In this image portion, if an outline edge of an object exists, the outline edge may have various orientations. It is possible assume various possible orientations of object outline edges in the image portion in advance, and extract features for characterizing the object outline edges according to the assumed orientations, so as to be able to adopt features with more discriminating capability in the classifier.

Figure 4A:
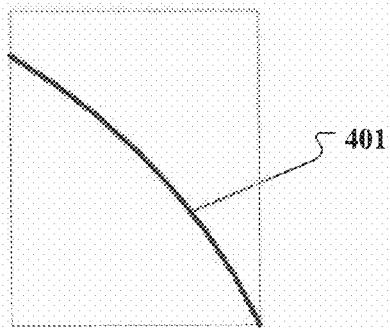
FIG. 4a is a schematic diagram showing an object outline edge included in the portion 302 as shown in FIG. 3a, FIG. 4b is a schematic diagram showing a plurality of predetermined orientations.
Figure 4B:
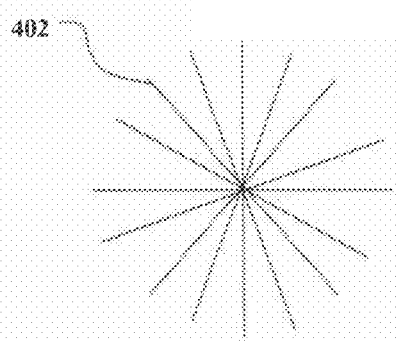
FIG. 4c is a diagram showing examples of difference vector and projection difference vector.
FIG. 4d shows examples of projection relation between difference vectors and projection difference vectors.

For example, FIG. 4a is a schematic diagram showing object outline edges included in the image portion 302 as shown in FIG. 3a. FIG. 4b is s schematic diagram showing a plurality of predetermined orientations. It can be seen that orientation 402 in FIG. 4b is close to that of object outline edge 401 shown in FIG. 4a. By extracting features based on the orientation 402, it is able to characterize the object outline edge 401 well.

Therefore, in the embodiments of the present invention, features on the same dimension of the feature vector are determined by a combination of a respective feature area and one of a plurality of predetermined orientations, that is to say, each of the features corresponds to a combination of a plurality of first areas arranged in the direction of the first axis, a plurality of second areas arranged in the direction of the second axis intersecting with the direction of the first axis, and one of a plurality of predetermined orientations.

The combination corresponding to features on each dimension of the feature vector may be determined in advance according to the above method, and may be employed by the apparatus 100 at time of running. If the combination corresponding to features on each dimension of the feature vector has not been determined when the apparatus 100 runs, the apparatus 100 may include a determination unit for determining these combinations according to the above method.

The difference calculating unit 102 will be described in the following. Because a feature extracted before training a classifier may not necessarily become the feature adopted by the classifier, to make the description clearer, features extracted before training the classifier and combinations of first area, second area and predetermined orientation corresponding to the features are called as candidate features and candidate combinations respectively.

Returning to FIG. 1, for an input image, the difference calculating unit 102, with respect to each of the first candidate features of the feature vector to be extracted, acquires a difference (also called as a first difference) between sums or mean values (for example, grey scale) of pixels of the plurality of first areas in the corresponding candidate combination to obtain a first difference vector in the direction of the first axis, and acquires a difference (also called as a second difference) between sums or mean values (for example, grey scale) of pixels of the plurality of second areas in the corresponding candidate combination to obtain a second difference vector in the direction of the second axis.

The magnitude of a difference vector is the absolute value of the corresponding difference. If the difference is positive, the direction of the corresponding difference vector is that of the corresponding axis; if the difference is negative, the direction of the corresponding difference vector is that opposite to the direction of the corresponding axis. Alternatively, if the difference is positive, the direction of the corresponding difference vector is that opposite to the direction of the corresponding axis; if the difference is negative, the direction of the corresponding difference vector is that of the corresponding axis. Alternatively, difference vectors may also be fixed in the direction of corresponding axes or its opposite direction, no matter whether the differences are positive or negative.

The difference between sums or mean values (grey scale) of pixels of areas on an axis is calculated for purpose of obtaining information reflecting the change in pixel grey scale in the direction of the corresponding axis. With respect to different area layouts, it is possible to determine corresponding methods of calculating the difference according to this purpose, as long as it is able to reflect this change. For example, a method of calculating differences according to layouts of area in a single direction has been disclosed in patent application WO 2008/151470, Ding et al., "A Robust Human Face Detecting Method In Complicated Background Image" (see page 9 to page 10 of the description).

For example, with respect to the area layout shown in FIGS. 2a and 2b, it is possible to calculate the first difference and the second difference through the following equation:

The first difference=pixel sum or mean value of the rectangular block 202−pixel sum or mean value of the rectangular block 201, The second difference=pixel sum or mean value of the rectangular block 204−pixel sum or mean value of the rectangular block 203.

For another example, with respect to the area layout shown in FIGS. 2c and 2d, it is possible to calculate the first difference and the second difference through the following equation:

The first difference=pixel sum or mean value of the rectangular block 206−pixel sum or mean value of the rectangular block 205, The second difference=pixel sum or mean value of the rectangular block 208−pixel sum or mean value of the rectangular block 207.

For another example, with respect to the area layout shown in FIGS. 2e and 2f, it is possible to calculate the first difference and the second difference through the following equation:

The first difference=pixel sum or mean value of the rectangular block 209+pixel sum or mean value of the rectangular block 211−pixel sum or mean value of the rectangular block 210×2, The second difference=pixel sum or mean value of the rectangular block 212+pixel sum or mean value of the rectangular block 214−pixel sum or mean value of the rectangular block 213×2.

For another example, with respect to the area layout shown in FIGS. 2g and 2h, it is possible to calculate the first difference and the second difference through the following equation:

The first difference=pixel sum or mean value of the rectangular block 216−pixel sum or mean value of the rectangular block 215, The second difference=pixel sum or mean value of the rectangular block 218−pixel sum or mean value of the rectangular block 217.

Figure 4C:
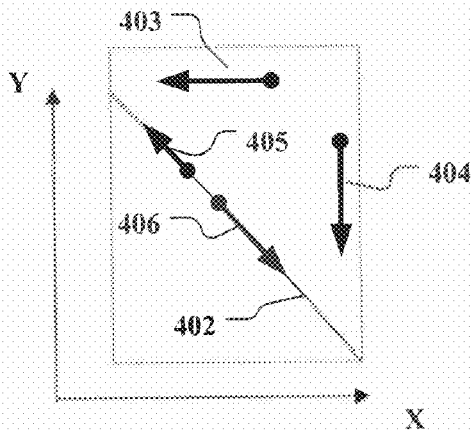

FIG. 4c is a diagram showing an example of difference vectors. In the example of FIG. 4c, assuming that the candidate combination corresponding to one of the candidate features to be extracted comprises the area layout as shown in FIGS. 2a and 2b, the feature area determined by the position 302 as shown in FIG. 3a and the orientation 402 as shown in FIG. 4b, and also assuming that if a difference is positive, the direction of the corresponding difference vector is that of the corresponding axis; if the difference is negative, the direction of the corresponding difference vector is that opposite to the direction of the corresponding axis. Because pixels in the upper right part of the portion 302 are darker, i.e., have lower grey scale values, and pixels in the lower left part are brighter, i.e., have higher grey scale values, the first difference and the second difference calculated according to the following equations are negative:

The first difference=pixel sum or mean value of the rectangular block 202−pixel sum or mean value of the rectangular block 201, The second difference=pixel sum or mean value of the rectangular block 204−pixel sum or mean value of the rectangular block 203.

Accordingly, the obtained first difference vector and second difference vector are respectively shown by vector 403 and 404 in FIG. 4c.

Returning to FIG. 1, accordingly, the difference calculating unit 102 obtains a first projection difference vector and a second projection difference vector projected by the first difference vector and the second difference vector on the line of the predetermined orientation in the corresponding candidate combination.

Any projection relation may exist between the difference vector and the projection difference vector herein, comprising but not limited to orthographic projection relation and oblique projection relation, as long as it meets the requirement that the magnitude of the projection difference vector becomes larger as the magnitude of the difference vector increases.

FIG. 4c also shows an example of the projection difference vector for the difference vector. As shown in FIG. 4c, vectors 405 and 406 are projection difference vectors respectively projected by difference vectors 403 and 404 on the line of a predetermined orientation 402 in a candidate combination.

In a specific example, the angle by which a plurality of predetermined orientations are rotated relative to the first axis or the second axis may range from 0 degree to 180 degree. The rotation may be clockwise or counterclockwise. Further, angles between adjacent predetermined orientations of the plurality of predetermined orientations are identical, and are 15 degree in a specific example. Then, these predetermined orientations are rotated by 0 degree, 15 degree, 30 degree, 45 degree, . . . , 120 degree, . . . , 165 degree respectively relative to the first axis or the second axis. In case that the rotation angle ranges from 0 degree to 180 degree, the orientation is considered as non directional, because two directions are not discriminated on the line of the orientation.

In a specific example, the angle by which a plurality of predetermined orientations are rotated relative to the first axis or the second axis may range from 0 degree to 360 degree. The rotation may be clockwise or counterclockwise. Further, angles between adjacent predetermined orientations of the plurality of predetermined orientations are identical, and are 15 degree in a specific example. Then, these predetermined orientations are rotated by 0 degree, 15 degree, 30 degree, 45 degree, . . . , 120 degree, . . . , 165 degree, . . . , 345 degree respectively relative to the first axis or the second axis. In case that the rotation angle ranges from 0 degree to 360 degree, the orientation is considered as directional, because the same line may have two different orientations.

Figure 4D:
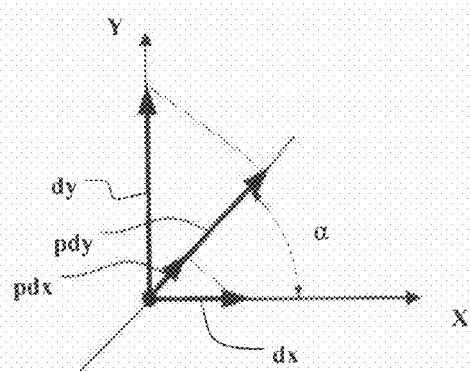

In a specific example as shown in FIG. 4d, let dx and dy represent the first difference vector and the second difference vector respectively, pdx and pdy represent the first projection difference vector and the second projection difference vector respectively, and a represents the angle rotated relative to the first axis counterclockwise, then $$pdx = dx \times \cos(\alpha)$$

$$pdy = dy \times \sin(\alpha).$$

Returning to FIG. 1, the feature calculating unit 103 obtains a sum of magnitudes of the first projection difference vector and the second projection difference vector as a candidate feature. In case of non directional orientation, magnitudes of all the projection difference vectors may be positive or may be negative. Alternatively, it is also possible to find a sum vector of two projection difference vectors and take the magnitude of the sum vector as the result. In case of directional orientation, if the direction of a projection difference vector is consistent with the direction of the orientation, the magnitude of the projection difference vector is positive, and if otherwise, the magnitude of the projection difference vector is negative, vice versa.

The training unit 104 trains the classifier according to the extracted feature vectors. Known methods may be used to train the classifier. For example, the supporting vector machine (SVM) method or the AdaBoost method may be used. In training the classifier, candidate features on some dimensions of the feature vector are abandoned due to their poor discriminating capabilities, and those candidate combinations corresponding to the remained features adopted in the classifier may be used for feature extracting by applications for object classifying or detecting.

FIG. 1 is a flow chart showing a method 500 of generating a classifier for discriminating object images and non-object images according to an embodiment of the present invention.

Figure 5:
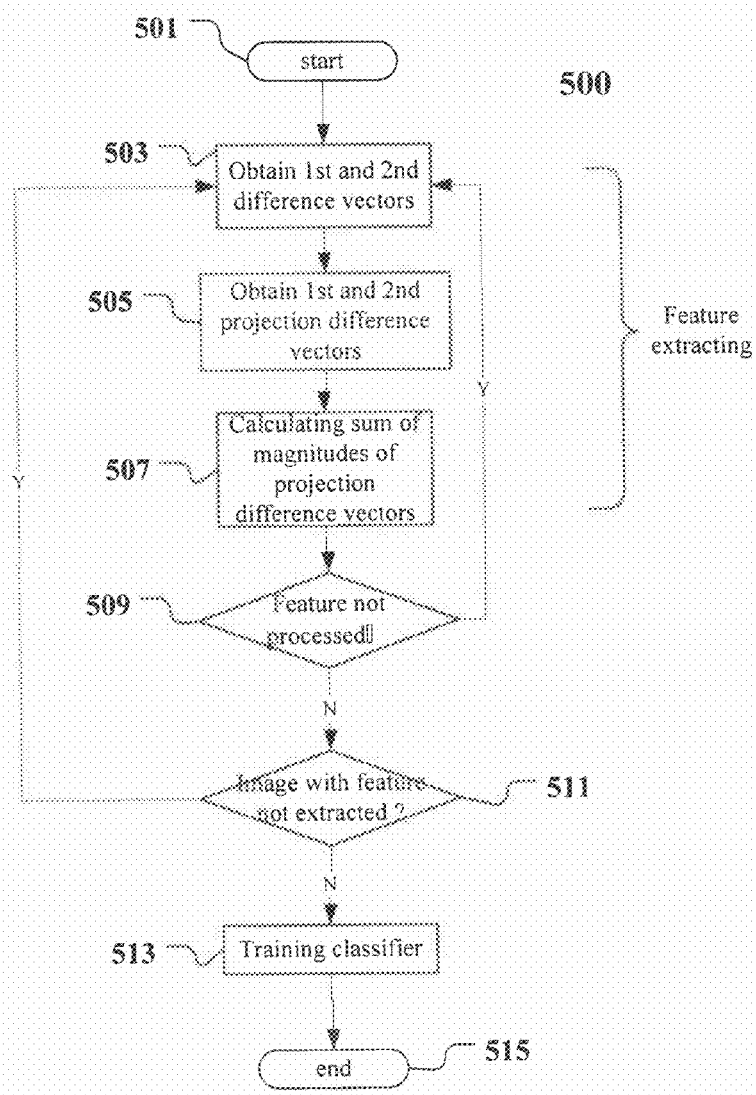
FIG. 5 is a flow chart showing a method of generating a classifier for discriminating object images and non-object images according to an embodiment of the present invention.

As shown in FIG. 5, the method 500 starts from step 501. Steps 503, 505 and 507 involve extracting a group of candidate features as a feature vector from a present input image.

At step 503, for the input image, with respect to each of the first candidate features of the feature vector to be extracted, a difference (also called as a first difference) between sums or mean values (for example, grey scale) of pixels of the plurality of first areas in the corresponding candidate combination is acquired to obtain a first difference vector in the direction of the first axis, and a difference (also called as a second difference) between sums or mean values (for example, grey scale) of pixels of the plurality of second areas in the corresponding candidate combination is acquired to obtain a second difference vector in the direction of the second axis.

The magnitude of a difference vector is the absolute value of the corresponding difference. If the difference is positive, the direction of the corresponding difference vector is that of the corresponding axis; if the difference is negative, the direction of the corresponding difference vector is that opposite to the direction of the corresponding axis. Alternatively, if the difference is positive, the direction of the corresponding difference vector is that opposite to the direction of the corresponding axis; if the difference is negative, the direction of the corresponding difference vector is that of the corresponding axis. Alternatively, difference vectors may also be fixed in the direction of corresponding axes or its opposite direction, no matter whether the differences are positive or negative.

As described by referring to FIG. 1, a method disclosed in patent application WO 2008/151470, Ding et al., "A Robust Human Face Detecting Method In Complicated Background Image" may be used to collect and prepare input images including object images and non-object images (see page 2 to page 3 of the description).

The candidate combinations may be those described in the above in connection with the embodiments of the apparatus for generating a classifier. The candidate combination corresponding to features on each dimension of the feature vector may be determined in advance according to the method described in the above in connection with the embodiments of the apparatus for generating a classifier, and may be employed at time of executing the method 500. If the candidate combination corresponding to features on each dimension of the feature vector has not been determined at time of executing the method 500, the method 500 may include, before step 503, a step of determining these candidate combinations according to the method described in the above in connection with the embodiments of the apparatus for generating a classifier.

The difference between sums or mean values (grey scale) of pixels of areas on an axis is calculated for purpose of obtaining information reflecting the change in pixel grey scale in the direction of the corresponding axis. With respect to different area layouts, it is possible to determine corresponding methods of calculating the difference according to this purpose, as long as it is able to reflect this change. For example, a method of calculating differences according to layouts of area in a single direction has been disclosed in patent application WO 2008/151470, Ding et al., "A Robust Human Face Detecting Method In Complicated Background Image" (see page 9 to page 10 of the description). For another example, it is possible to employ the calculating method describe in the above in connection with the examples of FIG. 2.

At step 505, a first projection difference vector and a second projection difference vector projected by the first difference vector and the second difference vector on the line of the predetermined orientation in the corresponding candidate combination are obtained.

Any projection relation may exist between the difference vector and the projection difference vector herein, comprising but not limited to orthographic projection relation and oblique projection relation, as long as it meets the requirement that the magnitude of the projection difference vector becomes larger as the magnitude of the difference vector increases.

In a specific example, the angle by which a plurality of predetermined orientations are rotated relative to the first axis or the second axis may range from 0 degree to 180 degree. The rotation may be clockwise or counterclockwise. Further, angles between adjacent predetermined orientations of the plurality of predetermined orientations are identical, and are 15 degree in a specific example. Then, these predetermined orientations are rotated by 0 degree, 15 degree, 30 degree, 45 degree, ..., 120 degree, ..., 165 degree respectively relative to the first axis or the second axis. In case that the rotation angle ranges from 0 degree to 180 degree, the orientation is considered as non directional, because two directions are not discriminated on the line of the orientation.

In a specific example, the angle by which a plurality of predetermined orientations are rotated relative to the first axis or the second axis may range from 0 degree to 360 degree. The rotation may be clockwise or counterclockwise. Further, angles between adjacent predetermined orientations of the plurality of predetermined orientations are identical, and are 15 degree in a specific example. Then, these predetermined orientations are rotated by 0 degree, 15 degree, 30 degree, 45 degree, ..., 120 degree, ..., 165 degree, ..., 345 degree respectively relative to the first axis or the second axis. In case that the rotation angle ranges from 0 degree to 360 degree, the orientation is considered as directional, because the same line may have two different orientations.

At step 507 then, a sum of magnitudes of the first projection difference vector and the second projection difference vector is obtained as a candidate feature. In case of non directional orientation, magnitudes of all the projection difference vectors may be positive or may be negative. Alternatively, it is also possible to find a sum vector of two projection difference vectors and take the magnitude of the sum vector as the result. In case of directional orientation, if the direction of a projection difference vector is consistent with the direction of the orientation, the magnitude of the projection difference vector is positive, and if otherwise, the magnitude of the projection difference vector is negative, vice versa.

At step 509 then, it is determined whether there is any candidate feature not extracted for the present input image. If there is a candidate feature not extracted, the process returns to step 503 to extract the next candidate feature; if otherwise, the process proceeds to step 511.

At step 511, it is determined whether there is any input image with feature vectors not extracted. If there is an input image with feature vectors not extracted, the process returns to step 503 to extract the feature vectors of the next input image; if otherwise, the process proceeds to step 513.

At step 513, the classifier is trained according to the extracted feature vectors. Known methods may be used to train the classifier. For example, the supporting vector machine (SVM) method or the AdaBoost method may be used. In training the classifier, candidate features on some dimensions of the feature vector are abandoned due to their poor discriminating capabilities, and those candidate combinations corresponding to the remained features adopted in the classifier may be used for feature extracting by applications for object classifying or detecting.

The method 500 ends at step 515.

Figure 6A:
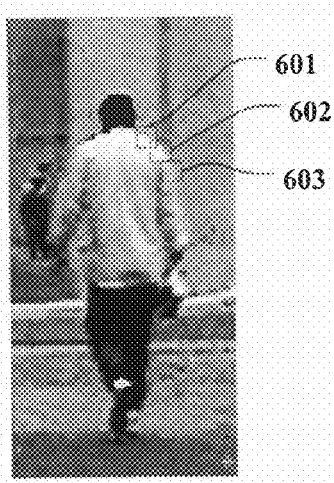
FIG. 6a is a schematic diagram showing an example of coverage of candidate combinations having an association therebetween.
Figure 6B:
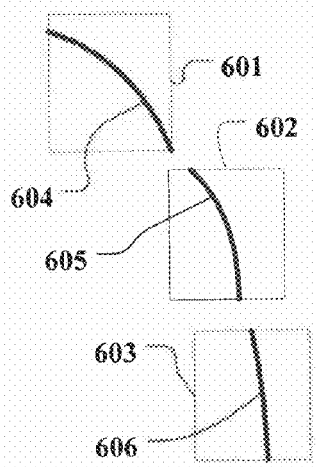
FIG. 6b is a schematic diagram showing an example of object outline edge portions having consecutive property.

In the embodiment described in the above, the extracted feature vectors are composed of isolated candidate features. In fact, because of the consecutive property of object outline edges, an association may exist among some features. FIG. 6a shows an example of such an association. As shown in FIG. 6a, there are three combinations, and approximate coverage of respective feature areas of the combinations are as shown by blocks 601, 602 and 603. The three blocks cover an outline edge portion from right shoulder to upper right arm of the object. FIG. 6b shows more clearly outline edge portions 604, 605 and 606 of the object covered by the three blocks. It can be seen from FIGS. 6a and 6b that the outline edges covered by the three blocks reflect the consecutive property of object outline edges. If the features reflected by the three blocks are associated to extract a feature which can reflect this consecutive property of outline edges, its discriminating capability is apparently stronger than that of three isolated features.

Although it is able to combine isolated features having stronger discriminating capability through filtering and merging features in the training process, this training process cannot discover and utilize this association among a plurality of features reflecting the consecutive property of object outline edges.

With respect to the apparatus as described in the above for generating a classifier for discriminate object images and non-object images, to facilitate discovering and utilizing the association among a plurality of features reflecting the consecutive property of object outline edges, in addition to the candidate combinations prepared in advance or determined by the determination unit, at least one set is also prepared in advance or determined by the determination unit, wherein each set includes at least two of these candidate combinations. Accordingly, the extracted feature vector further includes a candidate feature (also called as a joint candidate feature) corresponding to each of such sets.

In a further improvement of the embodiment as shown in FIG. 1, in addition to obtaining the first projection difference vector and the second projection difference vector corresponding to each isolated candidate feature, the difference calculating unit 102 is further configured to, with respect to each of the joint candidate features, acquire a difference between sums or mean values of pixels of the plurality of first areas in each candidate combination of the set corresponding to the joint candidate feature to obtain a first difference vector in the direction of the first axis, acquire a difference between sums or mean values of pixels of the plurality of second areas in the candidate combination to obtain a second difference vector in the direction of the second axis, and acquire a first projection difference vector and a second projection difference vector projected by the first difference vector and the second difference vector on the line of the predetermined orientation in the candidate combination. Here, with respect to each candidate combination in the set, the method of acquiring the corresponding first difference vector, second difference vector, first projection difference vector and second projection difference vector by the difference calculating unit 102 is identical to the method as described in the above of acquiring the first difference vector, second difference vector, first projection difference vector and second projection difference vector corresponding to the isolated candidate combination by the difference calculating unit 102, and will not be described again.

In addition to acquiring, as described in the above, a sum of magnitudes of the first projection difference vector and the second projection difference vector corresponding to each isolated candidate feature, with respect to respective pairs of first projection difference vector and second projection difference vector corresponding to the candidate combinations in each set, the feature calculating unit 103 obtains a sum of magnitudes of each pair of first projection difference vector and second projection difference vector. The method of obtaining the sum of magnitudes of each pair of first projection difference vector and second projection difference vector by the feature calculating unit 103 is identical to the method of obtaining, as described in the above, a sum of magnitudes of the first projection difference vector and the second projection difference vector corresponding to an isolated candidate combination by the feature calculating unit 103, and will not be described again. Further, the feature calculating unit 103 obtains a mean value or a sum of the sums corresponding to respective candidate combinations in each set (i.e., sums of magnitudes of respective pairs of first projection difference vector and second projection difference vector), as a joint candidate feature corresponding to the set. The above sum of the sums may also be a weighted sum, wherein it is possible to allocate smaller weights to sums corresponding to the candidate combinations covering more pixels, and allocate larger weights to sums corresponding to the candidate combinations covering less pixels.

The function of the training unit 104 is identical to that as described in the above, and therefore will not be described again.

In the above embodiment, respective sets include simple combinations of candidate combinations. In fact, the object outline edge reflected by a joint candidate feature may not be too long, that is to say, the number of candidate combinations included in the set may not be too large. If otherwise, the characterizing capability of the feature will be damaged, thereby reducing the discriminating capability of the feature. Therefore, in a preferable embodiment, the number of candidate combinations included in each set is limited below a threshold. The threshold may be from 5 to 10, for example. In addition, because of the consecutive property of object outline edges, image portions covered by respective candidate combinations of each set may not be separated with too far. Therefore, in a preferable embodiment, it is possible to restrict candidate combinations included in each set so that the distance between the coverage area of each candidate combination and the coverage area of at least one other candidate combination is below a threshold, that is to say, they are close to each other. For example, the distance may be measured with a distance between geometry centers of the coverage areas. The threshold should be chosen by considering the size of the coverage areas. For a smaller coverage area, the threshold is smaller accordingly. For a larger coverage area, the threshold is larger accordingly.

In the above embodiments, in determining the candidate combinations included in each set, less limitations are imposed on the association among a plurality of features reflecting the consecutive property of object outline edges. Consequently, there is a possibly that the candidate combinations included in a significant number of sets cannot reflect such an association. This may limit the improvement of the classifier's performance. A simple improvement involves increasing the number of sets, but this may increase workload and reduce efficiency.

Figure 7:
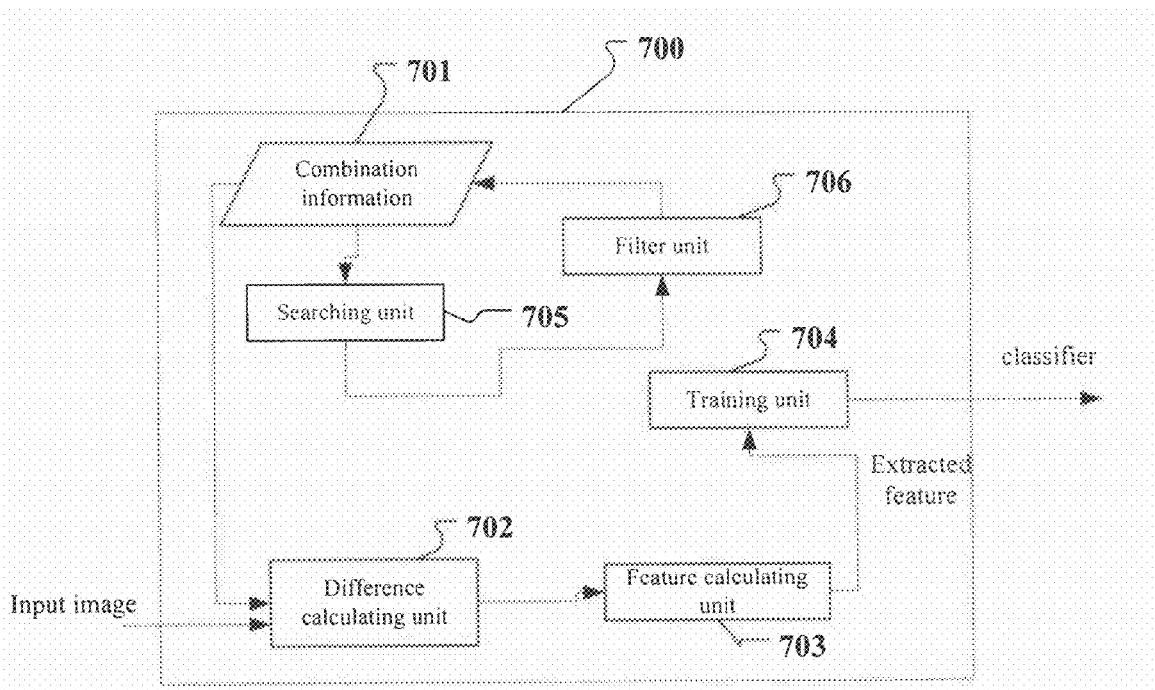
FIG. 7 is a block diagram showing the structure of an apparatus for generating a classifier for discriminating object images and non-object images according to a preferable embodiment of the present invention.

FIG. 7 is a block diagram showing the structure of an apparatus 700 for generating a classifier for discriminating object images and non-object images according to a preferable embodiment of the present invention.

As shown in FIG. 7, the apparatus 700 comprises a difference calculating unit 702, a feature calculating unit 703, a training unit 704, a searching unit 705 and a filtering unit 706.

Combination information 701 includes isolated candidate combinations described in the above in connection with the embodiments of the methods and the apparatus for generating a classifier.

The searching unit 105 searches for at least one set from isolated candidate combinations in the combination information 701. Each set includes at least two isolated candidate combinations meeting the following conditions:

1) The candidate combinations can form a sequence where a deviation between the predetermined orientations of adjacent combinations is within a predetermined range (for example, 45 degree, 90 degree), and respective coverage (i.e., coverage areas of the candidate combinations) of the areas (first areas and second areas) of the adjacent candidate combinations are close to each other;

2) Pixels covered by different isolated candidate combinations are not exactly the same as each other.

Figure 6C:
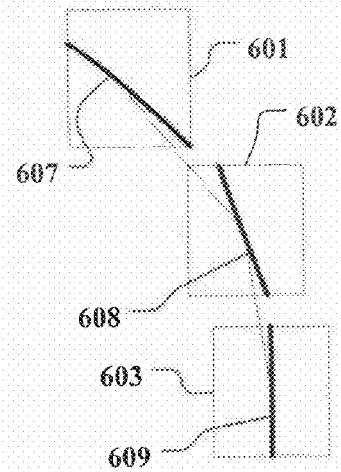
FIG. 6c is a diagram illustrating the orientation consistency constraint of candidate combinations.
Figures 6D, 6E:
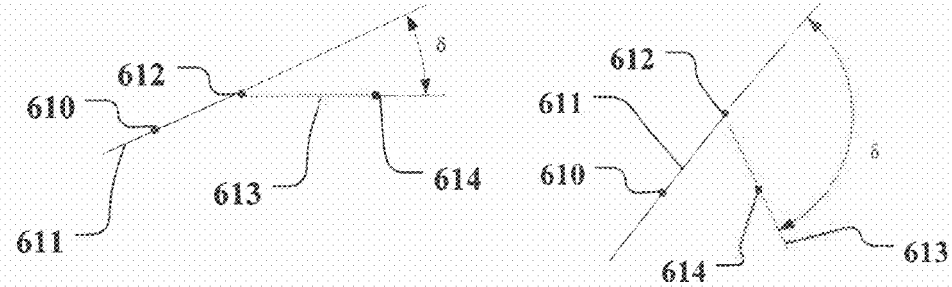
FIGS. 6d and 6e show examples of deviation of predetermined orientations for adjacent candidate combinations respectively.

In the present description, it is assumed that there are a line L1 along the predetermined orientation of a former candidate combination of adjacent candidate combinations and passing through a geometry center G1 of the coverage area of the former candidate combination, and a line L2 along the predetermined orientation of a latter candidate combination of the adjacent candidate combinations and passing through a geometry center G2 of the coverage area of the latter candidate combination, and the lines L1 and L2 intersects at a intersection C. The deviation between the predetermined orientations of the above adjacent candidate combinations refers to an angle between a side extending from the intersection C along the direction from the geometry center G1 to the intersection C and a side extending from the intersection C along the direction from the intersection C to the geometry center G2. FIGS. 6d and 6e respectively show examples of such a deviation, where dot 610 represents the geometry center G1 of the coverage area of a former candidate combination, line 611 represents the line L1, dot 614 represents the geometry center G2 of the coverage area of a latter candidate combination, line 613 represents the line L2, dot 612 represents a intersection of the lines L1 and L2, and angle δ represents the angle between a side extending from the intersection C along the direction from the geometry center G1 to the intersection C and a side extending from the intersection C along the direction from the intersection C to the geometry center G2, i.e., the deviation between the predetermined orientations of adjacent candidate combinations.

Condition 1) facilitates increasing the possibility that joint candidate features reflect the consecutive property of object outline edges. Respective portions of consecutive object outline edges usually have consistency of edge orientations. In condition 1), such consistency is characterized through a constraint that the deviation between the predetermined orientations of adjacent candidate combinations in the sequence falls within a predetermined range. FIG. 6c illustrates such a constraint in connection with the example of FIG. 6b. In FIG. 6c, the candidate combination corresponding to coverage area 601, the candidate combination corresponding to coverage area 602 and the candidate combination corresponding to coverage area 603 form a sequence. In the sequence, the candidate combination corresponding to the coverage area 601 is adjacent to the candidate combination corresponding to the coverage area 602, and the deviation between their orientations 607 and 608 is below 45 degree. Further, the candidate combination corresponding to the coverage area 602 is adjacent to the candidate combination corresponding to the coverage area 603, and the deviation between their orientations 608 and 609 is below 45 degree.

For condition 1), it is possible to ensure that adjacent candidate combinations are close to each other by keeping the distance between the coverage areas of the adjacent candidate combination below a threshold. For example, the distance may be measured with a distance between geometry centers of the coverage areas. The threshold should be chosen by considering the size of the coverage areas. For a smaller coverage area, the threshold is smaller accordingly. For a larger coverage area, the threshold is larger accordingly.

Condition 2) is for purpose of avoiding the case where coverage areas of different candidate combinations in the same set coincide with each other, or the case where one coverage area is included in another coverage area, i.e., avoiding redundancy.

In a simple implementation, the searching unit 705 may first obtain respective sets and then filtering sets not meeting conditions 1) and 2).

To increase the searching efficiency, alternatively, the searching unit 705 may take respective candidate combinations as seeds and attempt to form sequences meeting conditions 1) and 2) by combining each of the seeds with other candidate combinations. Further, the searching unit 705 may take an obtained sequence as a seed and form new sequences meeting conditions 1) and 2) through attempting to add other candidate combinations by starting from either of two ends of the obtained sequence. The above process may be executed iteratively until the sequences cannot grow or reach to a predetermined length limit. The above iterative process may be called as the growth of the sequences.

The filtering unit 706 incorporates each set, as a searching result, into the combination information 701 for extracting corresponding joint candidate feature.

The difference calculating unit 702 obtains a first projection difference vector and a second projection difference vector corresponding to each isolated candidate feature in the combination information 701. The process of this aspect is identical to that as described in the above in connection with the embodiments of the apparatus for generating a classifier, and therefore will not be described again.

Further, the difference calculating unit 702 is further configured to, with respect to each set in the combination information 701, acquire a difference between sums or mean values of pixels of the plurality of first areas in each candidate combination of the set to obtain a first difference vector in the direction of the first axis, acquire a difference between sums or mean values of pixels of the plurality of second areas in the candidate combination to obtain a second difference vector in the direction of the second axis, and acquire a first projection difference vector and a second projection difference vector projected by the first difference vector and the second difference vector on the line of the predetermined orientation in the candidate combination. Here, with respect to each candidate combination in the set, the method of acquiring the corresponding first difference vector, second difference vector, first projection difference vector and second projection difference vector by the difference calculating unit 702 is identical to the method as described in the above of acquiring the first difference vector, second difference vector, first projection difference vector and second projection difference vector corresponding to the isolated candidate combination by the difference calculating unit 102, and will not be described again.

The feature calculating unit 703 obtains a sum of magnitudes of a first projection difference vector and a second projection difference vector corresponding to each isolated candidate feature in the combination information 701. The process of this aspect is identical to that as described in the above in connection with the embodiments of the apparatus for generating a classifier, and therefore will not be described again.

Further, with respect to respective pairs of first projection difference vector and second projection difference vector corresponding to the candidate combinations in each set obtained by the difference calculating unit 702, the feature calculating unit 703 obtains a sum of magnitudes of each pair of first projection difference vector and second projection difference vector. The method of obtaining the sum of magnitudes of each pair of first projection difference vector and second projection difference vector by the feature calculating unit 703 is identical to the method of obtaining, as described in the above, a sum of magnitudes of the first projection difference vector and the second projection difference vector corresponding to an isolated candidate combination by the feature calculating unit 103, and will not be described again. Further, the feature calculating unit 703 obtains a mean value or a sum of the sums corresponding to respective candidate combinations in each set (i.e., sums of magnitudes of respective pairs of first projection difference vector and second projection difference vector), as a joint candidate feature corresponding to the set.

The function of the training unit 704 is identical to that as described in the above, and therefore will not be described again.

Figure 8:
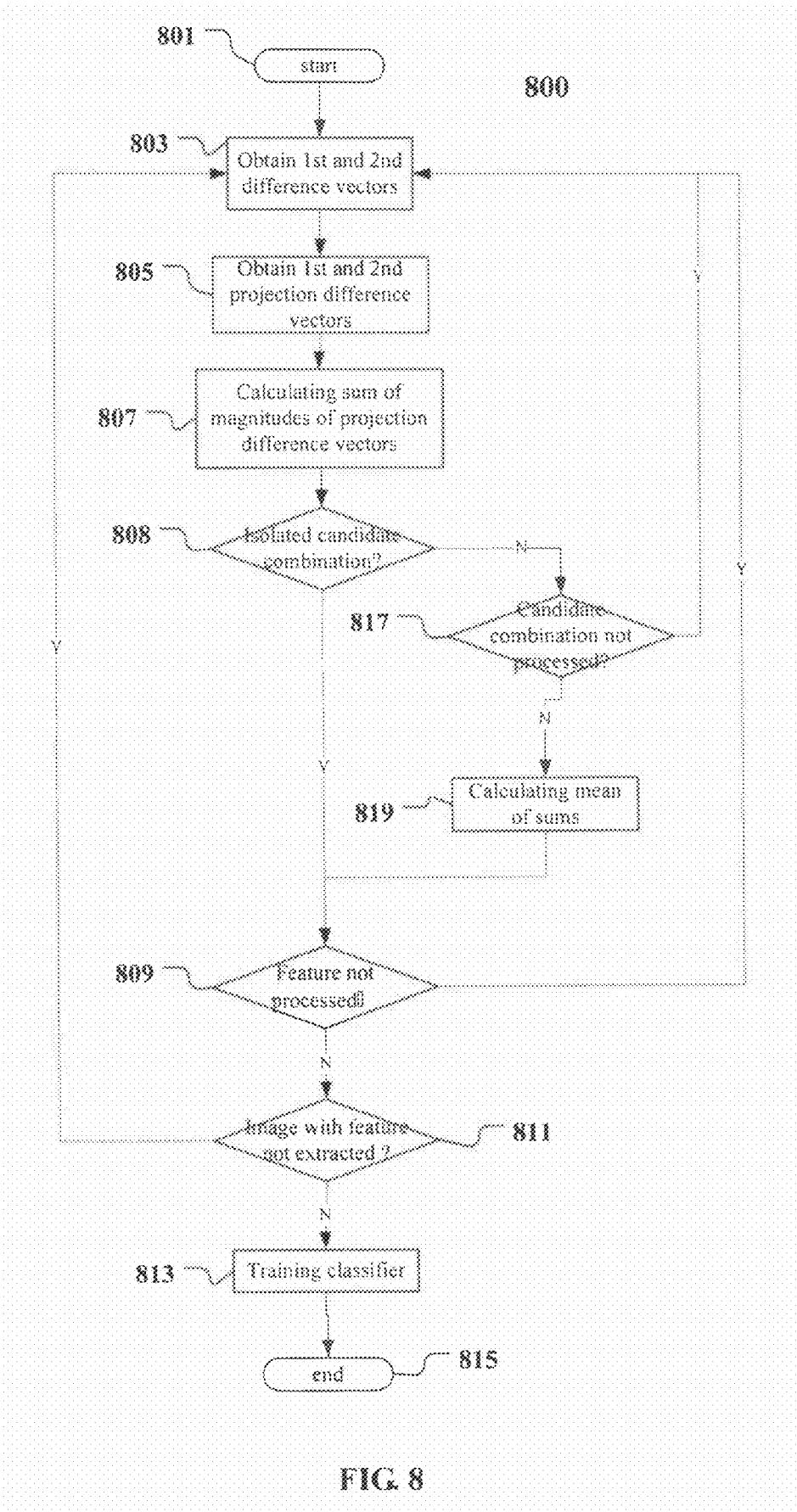
FIG. 8 is a flow chart showing a method of generating a classifier for discriminating object images and non-object images according to a preferable embodiment of the present invention.

FIG. 8 is a flow chart showing a method 800 of generating a classifier for discriminating object images and non-object images according to a preferable embodiment of the present invention.

As shown in FIG. 8, the method 800 starts from step 801.

At step 803, for the input image, with respect to each isolated candidate combination or each candidate combination of each set, a difference (also called as a first difference) between sums or mean values (for example, grey scale) of pixels of the plurality of first areas in the corresponding candidate combination is acquired to obtain a first difference vector in the direction of the first axis, and a difference (also called as a second difference) between sums or mean values (for example, grey scale) of pixels of the plurality of second areas in the corresponding candidate combination is acquired to obtain a second difference vector in the direction of the second axis.

At step 805, a first projection difference vector and a second projection difference vector projected by the first difference vector and the second difference vector on the line of the predetermined orientation in the corresponding candidate combination are obtained.

At step 807 then, a sum of magnitudes of the first projection difference vector and the second projection difference vector is obtained.

At step 808 then, it is determined whether the candidate combination corresponding to the calculated sum is an isolated candidate combination or a candidate combination in a set. If it is an isolated candidate combination, the calculated sum serves as a candidate feature and the process proceeds to step 809. If otherwise, at step 817, it is determined whether there is any candidate combination not processed in the set. If there is a candidate combination not processed, the process returns to step 803 to perform calculation on the next candidate combination not processed. If otherwise, the process proceeds to step 819 to calculate a mean value or a sum of the sums corresponding to respective candidate combinations in the set as a joint candidate feature corresponding to the set. Then the process proceeds to step 809.

At step 809, it is determined whether there is any candidate feature not extracted for the present input image. If there is a candidate feature not extracted, the process returns to step 803 to extract the next candidate feature; if otherwise, the process proceeds to step 811.

At step 811, it is determined whether there is any input image with feature vectors not extracted. If there is an input image with feature vectors not extracted, the process returns to step 803 to extract the feature vectors of the next input image; if otherwise, the process proceeds to step 813.

At step 813, the classifier is trained according to the extracted feature vectors.

The method 800 ends at step 815.

Figure 9:
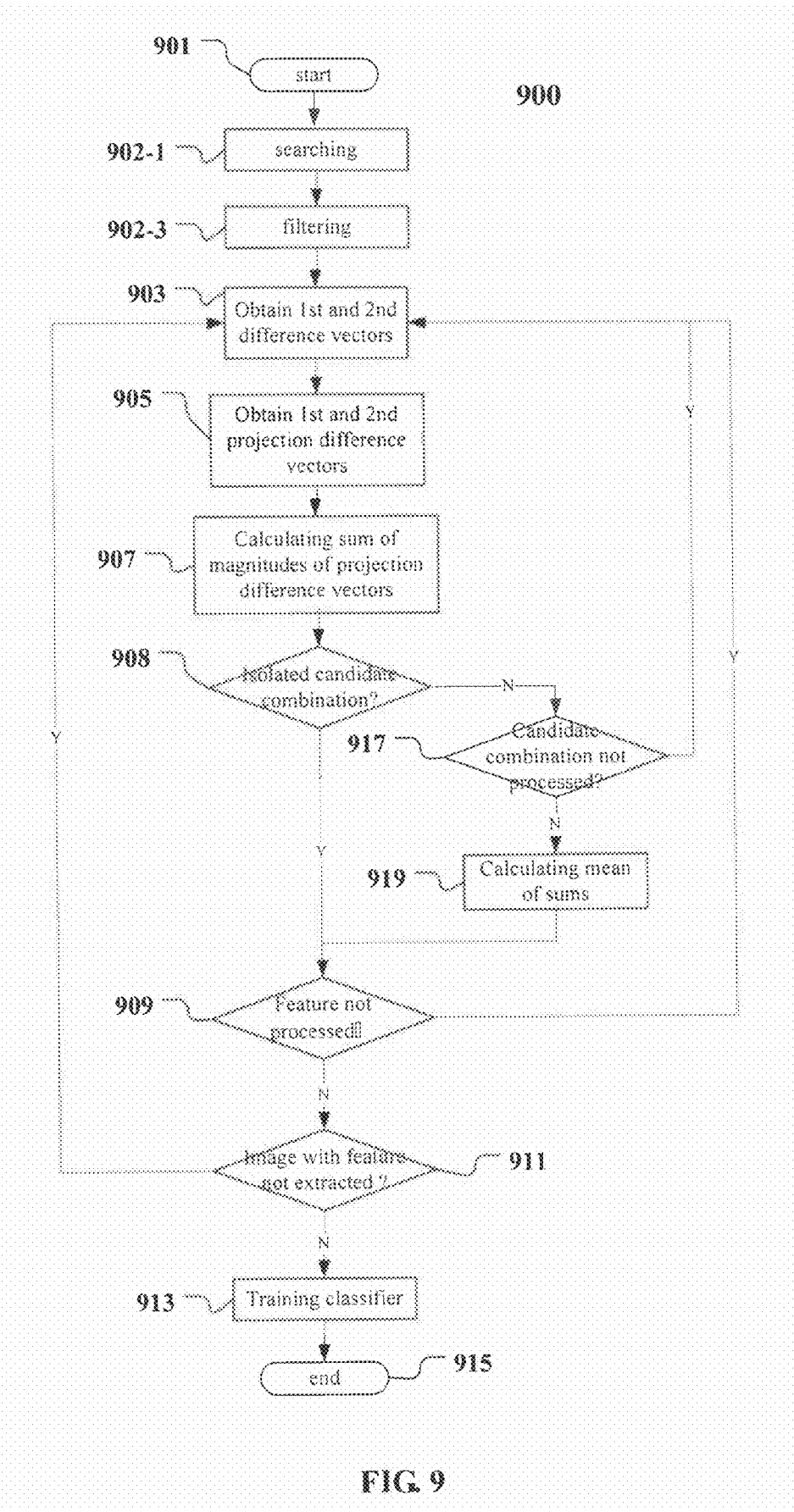
FIG. 9 is a flow chart showing a method of generating a classifier for discriminating object images and non-object images according to a preferable embodiment of the present invention.

FIG. 9 is a flow chart showing a method 900 of generating a classifier for discriminating object images and non-object images according to a preferable embodiment of the present invention.

As shown in FIG. 9, the method 900 starts from step 901.

At step 902-1, at least one set is searched for from isolated candidate combinations in the combination information. Each set includes at least two isolated candidate combinations meeting the following conditions:

1) The candidate combinations can form a sequence where a deviation between the predetermined orientations of adjacent combinations is within a predetermined range (for example, 45 degree, 90 degree), and respective coverage (i.e., coverage areas of the candidate combinations) of the areas (first areas and second areas) of the adjacent candidate combinations are close to each other;

2) Pixels covered by different isolated candidate combinations are not exactly the same as each other.

In a simple implementation, it is possible to first obtain respective sets and then filter sets not meeting conditions 1) and 2).

To increase the searching efficiency, alternatively, it is possible to take respective candidate combinations as seeds and attempt to form sequences meeting conditions 1) and 2) by combining each of the seeds with other candidate combinations. Further, it is possible to take an obtained sequence as a seed and form new sequences meeting conditions 1) and 2) through attempting to add other candidate combinations by starting from either of two ends of the obtained sequence. The above process may be executed iteratively until the sequences cannot grow or reach to a predetermined length limit. The above iterative process may be called as the growth of the sequences.

At step 902-3 then, each set, as a searching result, is incorporated into the combination information 701 for extracting corresponding joint candidate feature.

Other steps 903, 905, 907, 908, 9091, 911, 913, 915, 917 and 919 are identical to steps 803, 805, 807, 808, 809, 811, 813, 815, 817 and 819 in the method of FIG. 8, and therefore will not be described again.

Figure 10:
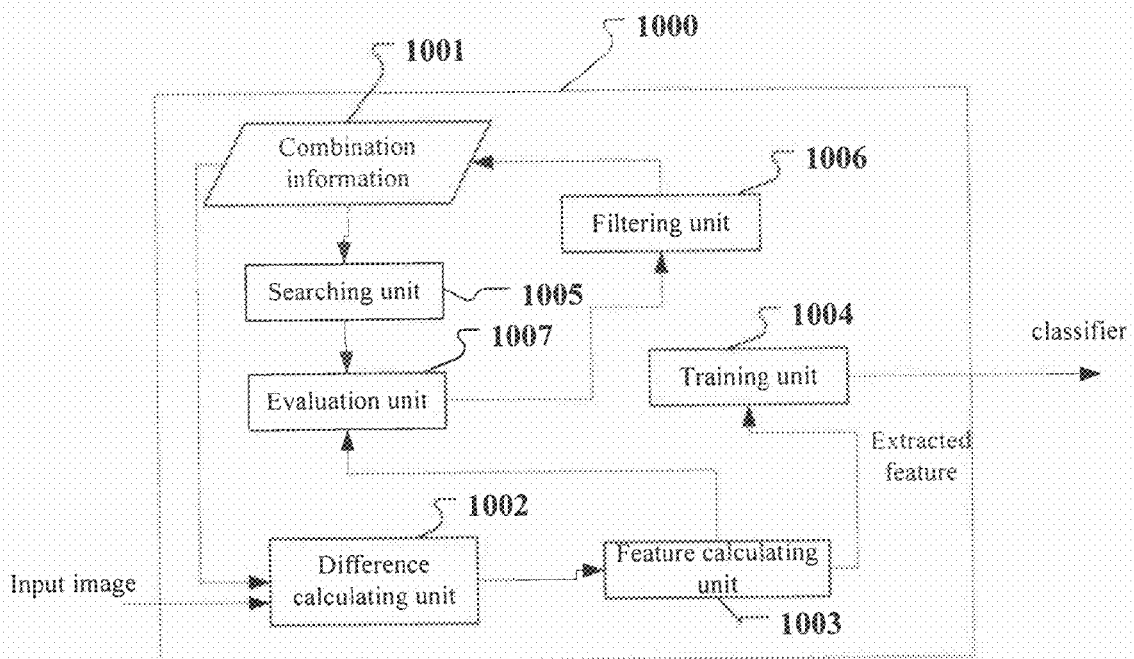
FIG. 10 is a block diagram showing the structure of an apparatus for generating a classifier for discriminating object images and non-object images according to a preferable embodiment of the present invention.

FIG. 10 is a block diagram showing the structure of an apparatus for generating a classifier for discriminating object images and non-object images according to a preferable embodiment of the present invention.

As shown in FIG. 10, the apparatus 1000 comprises a difference calculating unit 1002, a feature calculating unit 1003, a training unit 1004, a searching unit 1005, a filtering unit 1006 and an evaluation unit 1007.

Combination information 1001 includes isolated candidate combinations described in the above in connection with the embodiments of the methods and the apparatus for generating a classifier.

The difference calculating unit 1002, feature calculating unit 1003, training unit 1004 and searching unit 1005 are identical to the difference calculating unit 702, feature calculating unit 703, training unit 704 and searching unit 705 in the embodiment of FIG. 7 respectively, and therefore will not be described again.

With respect to each set searched by the searching unit 1005, the evaluation unit 1007 may obtain a joint candidate feature corresponding to each set to evaluate the discriminating capability of the joint candidate feature. As shown in FIG. 10, the evaluation unit 1007 may obtain the joint candidate feature through the difference calculating unit 1002 and the feature calculating unit 1003. Alternatively, the evaluation unit 1007 may also incorporate the function of the difference calculating unit 1002 and the feature calculating unit 1003 for extracting the joint candidate feature. It is possible to employ a known evaluating method to evaluate the discriminating capability of the joint candidate feature. For example, a classifier is constructed according to joint candidate features extracted from sample images and an error rate of the classifier is calculated with the sample images to measure the discriminating capability.

In case that the discriminating capability of the joint candidate feature satisfies a predetermined requirement, the filtering unit 1006 incorporates the set into the combination information 1001. If otherwise, the filtering unit excludes the set from the searched sets.

In a variation of the apparatus as shown in FIG. 10, it is possible to modify the searching unit 1005 to generate at least one set according to isolated candidate combinations corresponding to isolated candidate features, wherein each set includes at least two isolated candidate combinations.

The evaluation unit 1007 may obtain the joint candidate feature corresponding to each set to evaluate the discriminating capability of the joint candidate feature. The evaluation unit 1007 may obtain the joint candidate feature through the difference calculating unit 1002 and the feature calculating unit 1003. Alternatively, the evaluation unit 1007 may also incorporate the function of the difference calculating unit 1002 and the feature calculating unit 1003 for extracting the joint candidate feature.

The filtering unit 1006 may exclude the evaluated set from the generated sets if the discriminating capability of a joint candidate feature does not meet a predetermined requirement, and regard the isolated candidate combinations in each set meeting the predetermined requirement as isolated candidate combinations corresponding to one of the joint candidate features, i.e., incorporate the set in the combination information 1001.

In this variation, the requirements of the above conditions 1) and 2) are removed, and thus it is able to obtain features for characterizing a plurality of non- consecutive local edges in the object outline.

Of course, it is possible to generate the set, evaluate the discriminating capability and filter the set in an incremental and iterative manner.

Figure 11:
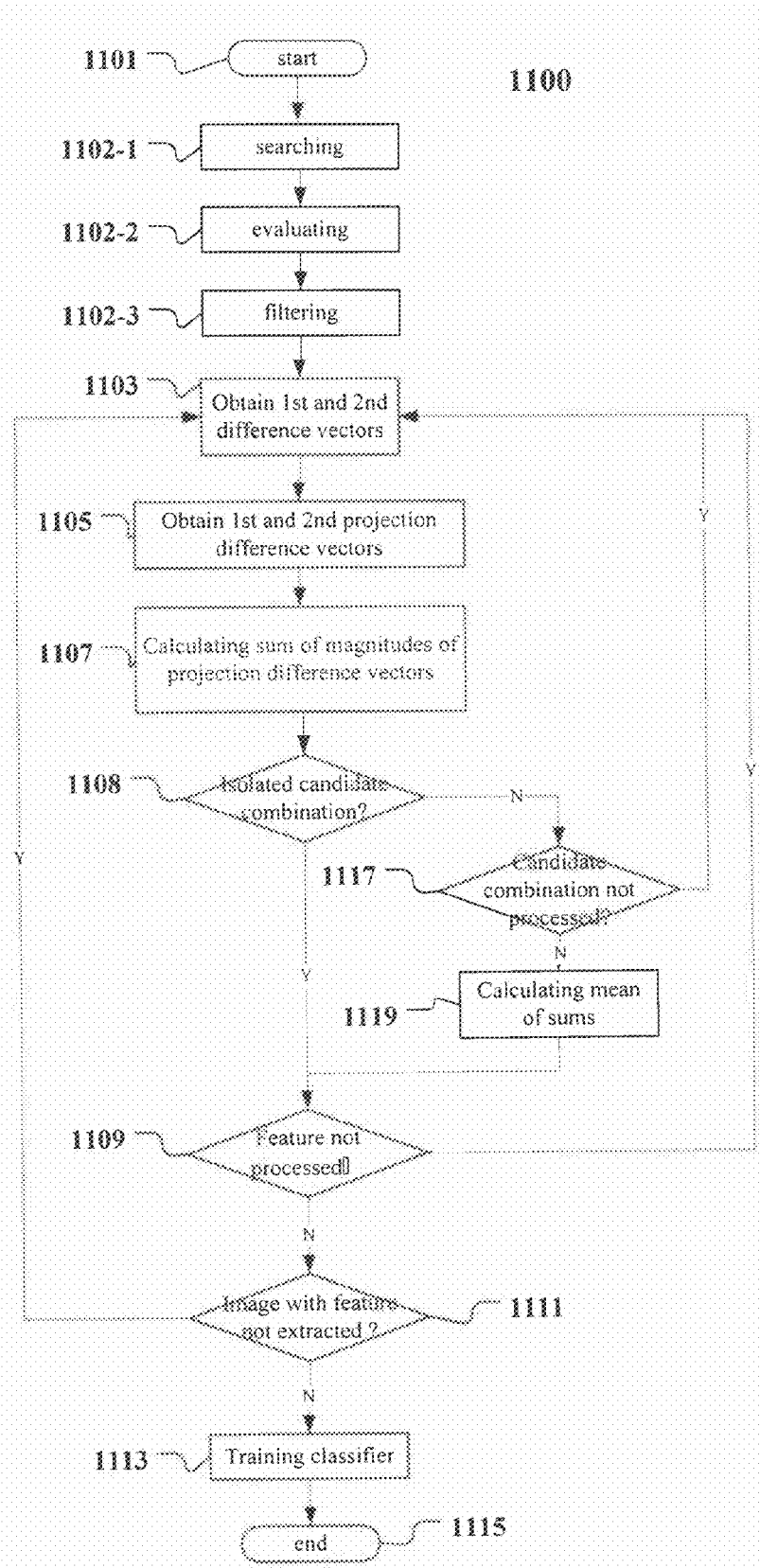
FIG. 11 is a flow chart showing a method of generating a classifier for discriminating object images and non-object images according to a preferable embodiment of the present invention.

FIG. 11 is a flow chart showing a method 1100 of generating a classifier for discriminating object images and non-object images according to a preferable embodiment of the present invention.

As shown in FIG. 11, the method 1100 starts from step 1101.

Step 1102-1 is identical to the step 902-1 in the method of FIG. 9, and therefore will not be described again.

At step 1102-2, with respect to each set searched at step 1102-1, a joint candidate feature corresponding to each set is obtained to evaluate the discriminating capability of the joint candidate feature. The joint candidate feature may be obtained through functions identical to that of steps 1103, 1105, 1107, 1108, 1117 and 1119. It is possible to employ a known evaluating method to evaluate the discriminating capability of the joint candidate feature. For example, a classifier is constructed according to joint candidate features extracted from sample images and an error rate of the classifier is calculated with the sample images to measure the discriminating capability.

At step 1102-3, in case that the discriminating capability of the joint candidate feature satisfies a predetermined requirement, the set is incorporated into the combination information 1001. If otherwise, the filtering unit excludes the set from the searched sets.

Other steps 1103, 1105, 1107, 1108, 1109, 1111, 1113, 1115, 1117 and 1119 are identical to steps 903, 905, 907, 908, 909, 911, 913, 915, 917 and 919 in the method of FIG. 9, and therefore will not be described again.

In a variation of the method as shown in FIG. 11, it is possible to modify the step 1102-1 to generate at least one set according to isolated candidate combinations corresponding to isolated candidate features, wherein each set includes at least two isolated candidate combinations.

At step 1102-2, with respect to each set searched at step 1102-1, a joint candidate feature corresponding to each set is obtained to evaluate the discriminating capability of the joint candidate feature.

At step 1102-3, the evaluated set is excluded from the generated sets if the discriminating capability of a joint candidate feature does not meet a predetermined requirement, and the isolated candidate combinations in each set meeting the predetermined requirement is regarded as isolated candidate combinations corresponding to one of the joint candidate features, i.e., incorporating the set in the combination information 1001.

In this variation, the requirements of the above conditions 1) and 2) are removed, and thus it is able to obtain features for characterizing a plurality of non- consecutive local edges in the object outline.

Of course, it is possible to generate the set, evaluate the discriminating capability and filter the set in an incremental and iterative manner.

In the above embodiments, sets are first searched as candidates and then the sets are evaluated and filtered. Preferably, it is possible to gradually perform the growth in the searching process and each time a new sequence (i.e., set) is generated, the set is evaluated and filtered. The process is performed iteratively until a condition for terminating the iteration is met, for example reaching to a predetermined number of iterations, finding a predetermined number of sets, unable to generate a new set, and the like. In addition, because the growth is performed at two ends of sequences, there is a possibility of missing some possible sets. Preferably, it is possible to obtain new sets by removing at one of two ends having no growth a candidate combination from the sequence in the growth process. With respect to a plurality of new sets as obtained, it is possible to keep those having better discriminating capability and abandon other new sets.

Embodiments of an apparatus and a method for classifying an image will be described below. Isolated candidate combinations and sets corresponding to the candidate features employed in the classifier obtained through training are kept in the combination information. The combination information is employed in the embodiments of an apparatus and a method for classifying an image. In the following description, the isolated candidate combinations and the candidate combinations in the sets which are kept in the combination information are called as isolated combinations and combinations of the sets. The candidate features and the joint candidate feature are also called as features and joint features.

Figure 12:
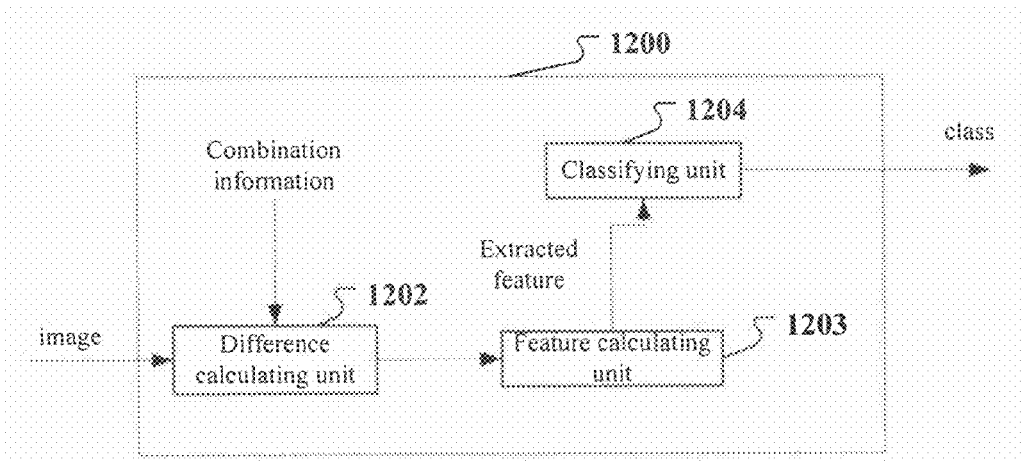
FIG. 12 is a block diagram showing the structure of an apparatus for classifying an image according to an embodiment of the present invention.

FIG. 12 is a block diagram showing the structure of an apparatus 1200 for classifying an image according to an embodiment of the present invention.

As shown in FIG. 12, the apparatus 1200 comprises a difference calculating unit 1202, a feature calculating unit 1203 and a classifying unit 1204.

The image input to the apparatus 1200 may be those of a predetermined size obtained from the images to be processed through a scanning window. The images may be obtained through a method disclosed in patent application WO 2008/ 151470, Ding et al., "A Robust Human Face Detecting Method In Complicated Background Image" (see page 5 of the description).

Features included in a feature vector to be extracted from the input image are determined by the isolated combinations and the sets included in the combination information.

For the input image, with respect to each feature of the feature vector to be extracted, the difference calculating unit 1202 acquires a difference (also called as a first difference) between sums or mean values (for example, grey scale) of pixels of the plurality of first areas in the corresponding combination to obtain a first difference vector in the direction of the first axis, and acquires a difference (also called as a second difference) between sums or mean values (for example, grey scale) of pixels of the plurality of second areas in the corresponding combination to obtain a second difference vector in the direction of the second axis.

The magnitude of a difference vector is the absolute value of the corresponding difference. If the difference is positive, the direction of the corresponding difference vector is that of the corresponding axis; if the difference is negative, the direction of the corresponding difference vector is that opposite to the direction of the corresponding axis. Alternatively, if the difference is positive, the direction of the corresponding difference vector is that opposite to the direction of the corresponding axis; if the difference is negative, the direction of the corresponding difference vector is that of the corresponding axis. Alternatively, difference vectors may also be fixed in the direction of corresponding axes or its opposite direction, no matter whether the differences are positive or negative.

The difference between sums or mean values (grey scale) of pixels of areas on an axis is calculated for purpose of obtaining information reflecting the change in pixel grey scale in the direction of the corresponding axis. With respect to different area layouts, it is possible to determine corresponding methods of calculating the difference according to this purpose, as long as it is able to reflect this change. For example, a method of calculating differences according to layouts of area in a single direction has been disclosed in patent application WO 2008/151470, Ding et al., "A Robust Human Face Detecting Method In Complicated Background Image" (see page 9 to page 10 of the description). For another example, it is possible to employ the calculating method describe in the above in connection with the examples of FIG. 2.

Accordingly, the difference calculating unit 1202 acquires a first projection difference vector and a second projection difference vector projected by the first difference vector and the second difference vector on the line of the predetermined orientation in the corresponding combination.

Any projection relation may exist between the difference vector and the projection difference vector herein, comprising but not limited to orthographic projection relation and oblique projection relation, as long as it meets the requirement that the magnitude of the projection difference vector becomes larger as the magnitude of the difference vector increases.

The feature calculating unit 1203 acquires a sum of magnitudes of the first projection difference vector and the second projection difference vector as an isolated feature. In case of non directional orientation, magnitudes of all the projection difference vectors may be positive or may be negative. Alternatively, it is also possible to find a sum vector of two projection difference vectors and take the magnitude of the sum vector as the result. In case of directional orientation, if the direction of a projection difference vector is consistent with the direction of the orientation, the magnitude of the projection difference vector is positive, and if otherwise, the magnitude of the projection difference vector is negative, vice versa.

The classifying unit 1204 classifies the input image according to the extracted feature vector.

Figure 13:
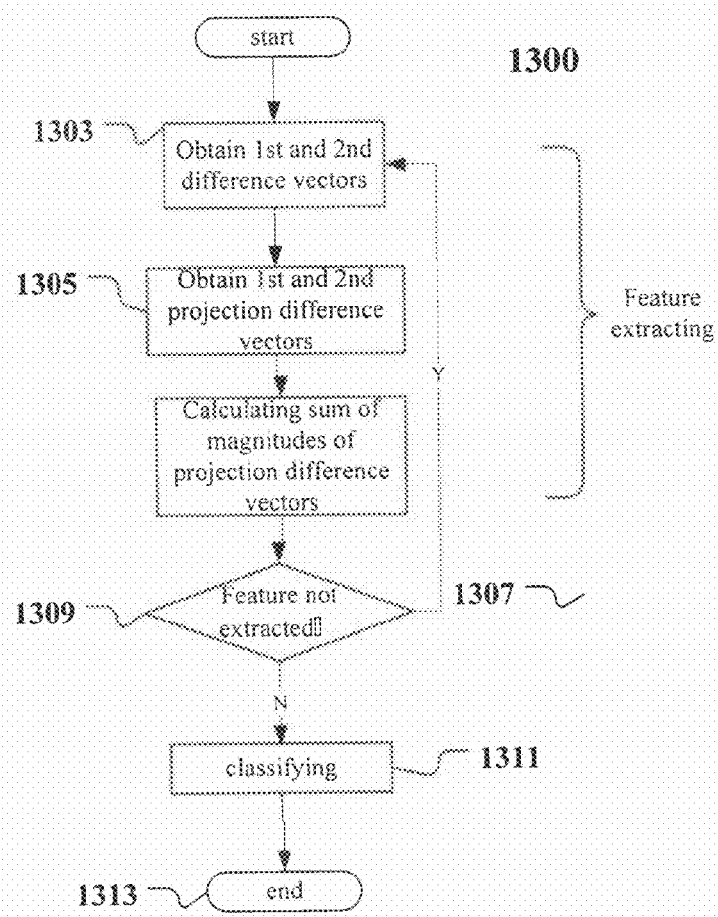
FIG. 13 is a flow chart showing a method of detecting an object in an image according to an embodiment of the present invention.

FIG. 13 is a flow chart showing a method 1300 of classifying an image according to an embodiment of the present invention.

As shown in FIG. 13, the method 1300 starts from step 1301. Steps 1303, 1305 and 1307 involve extracting a group of features as a feature vector from a present input image. Features included in a feature vector to be extracted from the input image are determined by the isolated combinations and the sets included in the combination information.

The input image may be those of a predetermined size obtained from the images to be processed through a scanning window. The images may be obtained through a method disclosed in patent application WO 2008/151470, Ding et al., "A Robust Human Face Detecting Method In Complicated Background Image" (see page 5 of the description).

At step 1303, for the input image, with respect to each of the features of the feature vector to be extracted, a difference (also called as a first difference) between sums or mean values (for example, grey scale) of pixels of the plurality of first areas in the corresponding combination is acquired to obtain a first difference vector in the direction of the first axis, and a difference (also called as a second difference) between sums or mean values (for example, grey scale) of pixels of the plurality of second areas in the corresponding combination is acquired to obtain a second difference vector in the direction of the second axis.

The magnitude of a difference vector is the absolute value of the corresponding difference. If the difference is positive, the direction of the corresponding difference vector is that of the corresponding axis; if the difference is negative, the direction of the corresponding difference vector is that opposite to the direction of the corresponding axis. Alternatively, if the difference is positive, the direction of the corresponding difference vector is that opposite to the direction of the corresponding axis; if the difference is negative, the direction of the corresponding difference vector is that of the corresponding axis. Alternatively, difference vectors may also be fixed in the direction of corresponding axes or its opposite direction, no matter whether the differences are positive or negative.

The difference between sums or mean values (grey scale) of pixels of areas on an axis is calculated for purpose of obtaining information reflecting the change in pixel grey scale in the direction of the corresponding axis. With respect to different area layouts, it is possible to determine corresponding methods of calculating the difference according to this purpose, as long as it is able to reflect this change. For example, a method of calculating differences according to layouts of area in a single direction has been disclosed in patent application WO 2008/151470, Ding et al., "A Robust Human Face Detecting Method In Complicated Background Image" (see page 9 to page 10 of the description). For another example, it is possible to employ the calculating method describe in the above in connection with the examples of FIG. 2.

At step 1305 then, a first projection difference vector and a second projection difference vector projected by the first difference vector and the second difference vector on the line of the predetermined orientation in the corresponding combination are acquired.

Any projection relation may exist between the difference vector and the projection difference vector herein, comprising but not limited to orthographic projection relation and oblique projection relation, as long as it meets the requirement that the magnitude of the projection difference vector becomes larger as the magnitude of the difference vector increases.

At step 1307 then, a sum of magnitudes of the first projection difference vector and the second projection difference vector is obtained as an isolated feature. In case of non directional orientation, magnitudes of all the projection difference vectors may be positive or may be negative. Alternatively, it is also possible to find a sum vector of two projection difference vectors and take the magnitude of the sum vector as the result. In case of directional orientation, if the direction of a projection difference vector is consistent with the direction of the orientation, the magnitude of the projection difference vector is positive, and if otherwise, the magnitude of the projection difference vector is negative, vice versa.

At step 1309 then, it is determined whether there is any feature not extracted for the present input image. If there is a feature not extracted, the process returns to step 1303 to extract the next feature; if otherwise, the process proceeds to step 1311.

At step 1311, the input image is classified according to the extracted feature vector.

The method 1300 ends at step 1313.

In a further improvement of the embodiment as shown in FIG. 12, the combination information further includes one or more sets, and consequently, the feature vector to be extracted further includes corresponding joint features. In addition to obtaining, as described in the above, the first projection difference vector and the second projection difference vector corresponding to each isolated feature, the difference calculating unit 1202 is further configured to, with respect to each of the joint features, acquire a difference between sums or mean values of pixels of the plurality of first areas in each combination of the set corresponding to the joint feature to obtain a first difference vector in the direction of the first axis, acquire a difference between sums or mean values of pixels of the plurality of second areas in the combination to obtain a second difference vector in the direction of the second axis, and acquire a first projection difference vector and a second projection difference vector projected by the first difference vector and the second difference vector on the line of the predetermined orientation in the combination. Here, with respect to each combination in the set, the method of acquiring the corresponding first difference vector, second difference vector, first projection difference vector and second projection difference vector by the difference calculating unit 1202 is identical to the method as described in the above of acquiring the first difference vector, second difference vector, first projection difference vector and second projection difference vector corresponding to the isolated combination by the difference calculating unit 1202, and will not be described again.

In addition to acquiring, as described in the above, a sum of magnitudes of the first projection difference vector and the second projection difference vector corresponding to each isolated feature, with respect to respective pairs of first projection difference vector and second projection difference vector corresponding to the combinations in each set acquired by the difference calculating unit 1202, the feature calculating unit 1203 obtains a sum of magnitudes of each pair of first projection difference vector and second projection difference vector. The method of obtaining the sum of magnitudes of each pair of first projection difference vector and second projection difference vector by the feature calculating unit 1203 is identical to the method of obtaining, as described in the above, a sum of magnitudes of the first projection difference vector and the second projection difference vector corresponding to an isolated combination by the feature calculating unit 1203, and will not be described again. Further, the feature calculating unit 1203 obtains a mean value or a sum of the sums corresponding to respective combinations in each set (i.e., sums of magnitudes of respective pairs of first projection difference vector and second projection difference vector), as a joint feature corresponding to the set.

The classifying unit 1204 classifies the input image according to the extracted feature vector.

Figure 14:
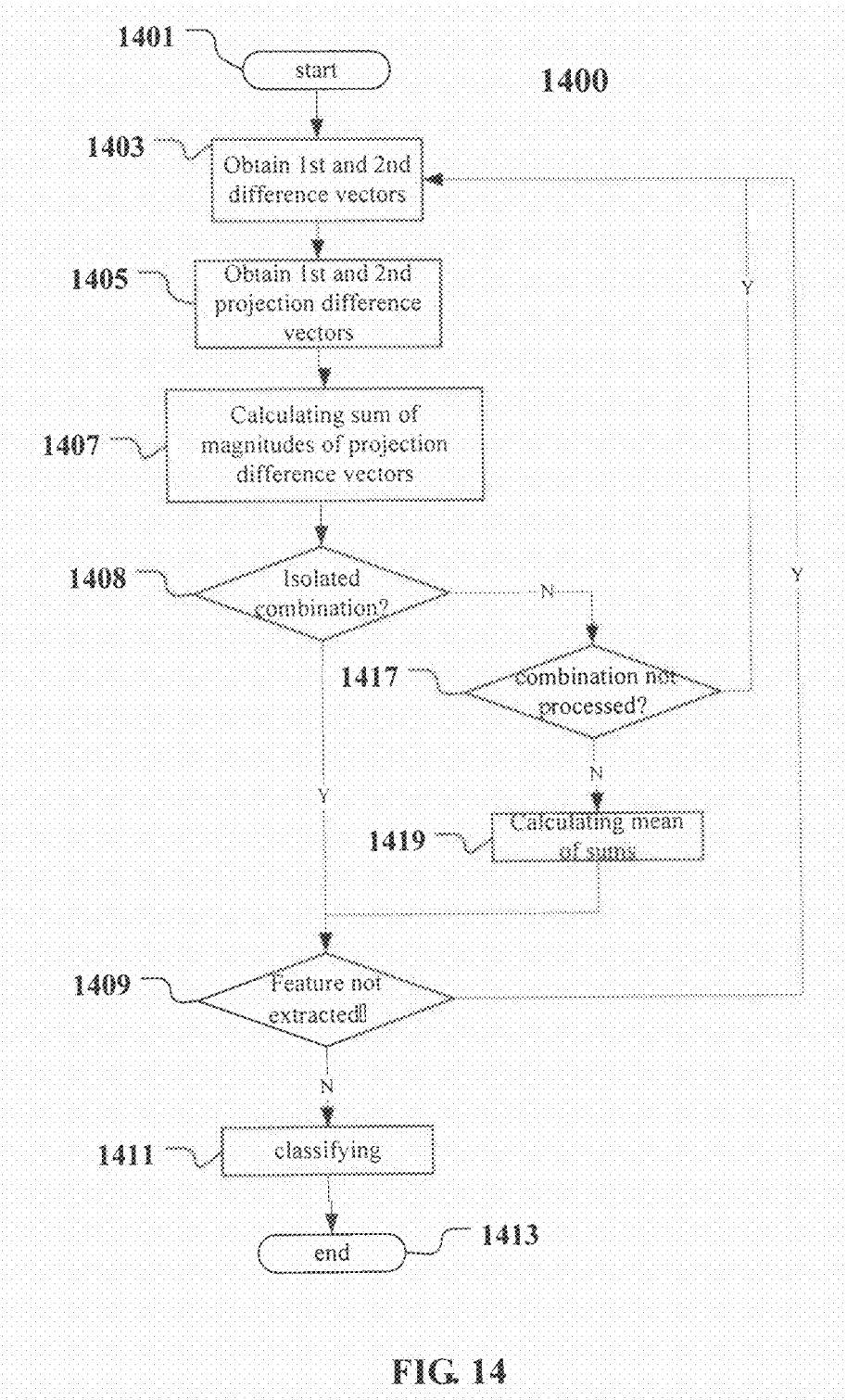
FIG. 14 is a flow chart showing a method of classifying according to a preferable embodiment of the present invention.

FIG. 14 is a flow chart showing a method 1400 of classifying an image according to an embodiment of the present invention. The combination information further includes one or more sets, and consequently, the feature vector to be extracted further includes corresponding joint features.

As shown in FIG. 14, the method 1400 starts from step 1401.

At step 1403, for the input image, with respect to each isolated combination or each combination of each set, a difference (also called as a first difference) between sums or mean values (for example, grey scale) of pixels of the plurality of first areas in the corresponding combination is acquired to obtain a first difference vector in the direction of the first axis, and a difference (also called as a second difference) between sums or mean values (for example, grey scale) of pixels of the plurality of second areas in the corresponding combination is acquired to obtain a second difference vector in the direction of the second axis.

At step 1405 then, a first projection difference vector and a second projection difference vector projected by the first difference vector and the second difference vector on the line of the predetermined orientation in the corresponding combination are acquired.

At step 1407 then, a sum of magnitudes of the first projection difference vector and the second projection difference vector is obtained.

At step 1408 then, it is determined whether the combination corresponding to the calculated sum is an isolated combination or a combination in a set. If it is an isolated combination, the calculated sum serves as an isolated feature and the process proceeds to step 1409. If otherwise, at step 1417, it is determined whether there is any combination not processed in the set. If there is a combination not processed, the process returns to step 1403 to perform calculation on the next combination not processed. If otherwise, the process proceeds to step 1419 to calculate a mean value or a sum of the sums corresponding to respective combinations in the set as a joint feature corresponding to the set. Then the process proceeds to step 1409.

At step 1409, it is determined whether there is any feature not extracted for the present input image. If there is a feature not extracted, the process returns to step 1403 to extract the next feature; if otherwise, the process proceeds to step 1411.

At step 1411, the input image is classified according to the extracted feature vector.

The method 1400 ends at step 1413.

The apparatuses and the method of the present invention may be implemented through hardware, software or a combination thereof.

In case of implementing through hardware, with respect to respective devices included in an apparatus, it is possible to design logical truth tables for inputs and outputs according to their functions, and then construct corresponding logic circuits with digital logic designing methods based on the logical truth tables. It is also possible to program programmable logic devices according to the logical truth tables to implement corresponding logic circuits. Respective devices may be connected through bus, dedicated connection or network. With respect to respective steps of the methods, it is possible to design logical truth tables for inputs and outputs according to their functions, and then construct corresponding logic circuits for performing the functions of the steps with digital logic designing methods based on the logical truth tables. It is also possible to program programmable logic devices according to the logical truth tables to implement corresponding logic circuits for performing the functions of the steps. The steps linked with each other may be connected through bus, dedicated connection or network.

In case of implementing with software, it is possible to write the functions of respective devices of the apparatus and the functions of respective steps of the method into computer programs through programming languages such as C, BASIC, JAVA or the like. When such computer programs are executed by computers such as personal computer, it is able to implement the function of the apparatus and the method.

Figure 15:
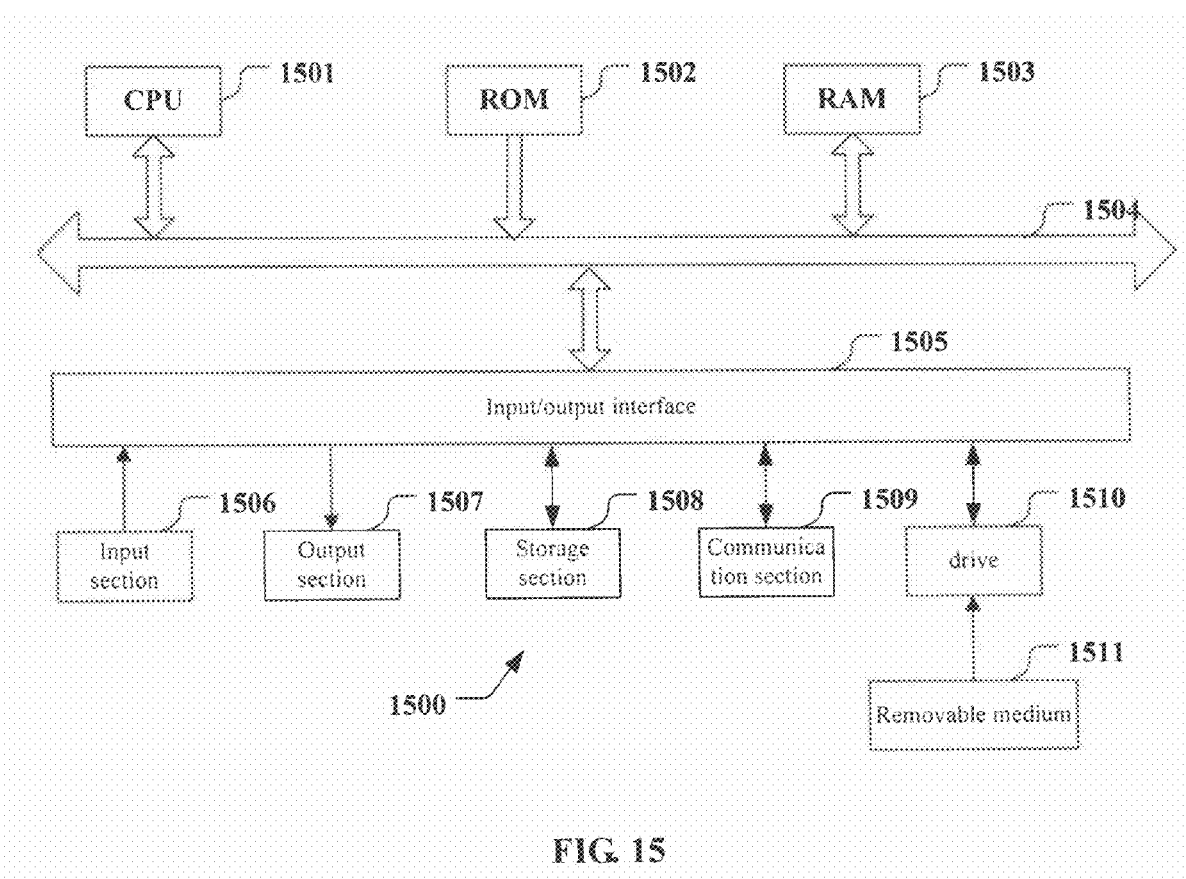
FIG. 15 is a block diagram showing the exemplary structure of a computer for implementing an embodiment of the present invention.

FIG. 15 is a block diagram showing an exemplary structure of a computer for implementing the apparatus and the method of the present invention.

In FIG. 15, a central processing unit (CPU) 1501 performs various processes in accordance with a program stored in a read only memory (ROM) 1502 or a program loaded from a storage section 1508 to a random access memory (RAM) 1503. In the RAM 1503, data required when the CPU 1501 performs the various processes or the like is also stored as required.

The CPU 1501, the ROM 1502 and the RAM 1503 are connected to one another via a bus 1504. An input/output interface 1505 is also connected to the bus 1504.

The following components connected to input/output interface 1505: an input section 1506 including a keyboard, a mouse, or the like; an output section 1507 including a display such as a cathode ray tube (CRT), a liquid crystal display (LCD), or the like, and a loudspeaker or the like; the storage section 1508 including a hard disk or the like; and a communication section 1509 including a network interface card such as a LAN card, a modem, or the like. The communication section 1509 performs a communication process via the network such as the internet.

A drive 1510 is also connected to the input/output interface 1505 as required. A removable medium 1511, such as a magnetic disk, an optical disk, a magneto-optical disk, a semiconductor memory, or the like, is mounted on the drive 1510 as required, so that a computer program read therefrom is installed into the storage section 1508 as required.

In the case where the above-described steps and processes are implemented by the software, the program that constitutes the software is installed from the network such as the internet or the storage medium such as the removable medium 1511.

One skilled in the art should note that, this storage medium is not limited to the removable medium 1511 having the program stored therein as illustrated in FIG. 15, which is delivered separately from the approach for providing the program to the user. Examples of the removable medium 1511 include the magnetic disk, the optical disk (including a compact disk-read only memory (CD-ROM) and a digital versatile disk (DVD)), the magneto-optical disk (including a mini-disk (MD)), and the semiconductor memory. Alternatively, the storage medium may be the ROM 1502, the hard disk contained in the storage section 1508, or the like, which have the program stored therein and is deliver to the user together with the method that containing them.

The present invention is described in the above by referring to specific embodiments. One skilled in the art should understand that various modifications and changes can be made without departing from the scope as set forth in the following claims.

We claim:

1. A method of classifying an image, comprising:
   extracting a feature vector from the image, wherein the feature vector comprises a plurality of first features, each of the first features corresponds to a combination of a plurality of first areas arranged in the direction of a first axis, a plurality of second areas arranged in the direction of a second axis intersecting with the direction of the first axis, and one of a plurality of predetermined orientations, and the extracting of each of the first features comprises:
   acquiring a difference between sums or mean values of pixels of the plurality of first areas in the corresponding combination to obtain a first difference vector in the direction of the first axis, and acquiring a difference between sums or mean values of pixels of the plurality of second areas in the corresponding combination to obtain a second difference vector in the direction of the second axis;
   acquiring a first projection difference vector and a second projection difference vector projected by the first difference vector and the second difference vector on the line of the predetermined orientation in the corresponding combination; and
   acquiring the sum of magnitudes of the first projection difference vector and the second projection difference vector as the first feature; and
   classifying the image according to the extracted feature vector.

2. An apparatus for classifying an image, the apparatus extracting a feature vector from the image, wherein the feature vector comprises a plurality of first features, each of the first features corresponds to a combination of a plurality of first areas arranged in the direction of a first axis, a plurality of second areas arranged in the direction of a second axis intersecting with the direction of the first axis, and one of a plurality of predetermined orientations, and the apparatus comprises:
   a difference calculating unit which with respect to each of the first features, acquires a difference between sums or mean values of pixels of the plurality of first areas in the corresponding combination to obtain a first difference vector in the direction of the first axis, acquires a difference between sums or mean values of pixels of the plurality of second areas in the corresponding combination to obtain a second difference vector in the direction of the second axis, and acquires a first projection difference vector and a second projection difference vector projected by the first difference vector and the second difference vector on the line of the predetermined orientation in the corresponding combination; and
   a feature calculating unit which acquires the sum of magnitudes of the first projection difference vector and the second projection difference vector as the first feature; and
   a classifying unit which classifies the image according to the extracted feature vector.

3. The apparatus according to claim 2, wherein the feature vector further comprises at least one second feature, wherein each of the second feature corresponds to at least two combinations of a plurality of first areas arranged in the direction of the first axis, a plurality of second areas arranged in the direction of the second axis intersecting with the direction of the first axis, and one of a plurality of predetermined orientations,
   wherein the difference calculating unit is further configured to, with respect to each of the at least two combinations corresponding to each of the second feature, acquire a difference between sums or mean values of pixels of the plurality of first areas in the corresponding combination to obtain a first difference vector in the direction of the first axis, acquire a difference between sums or mean values of pixels of the plurality of second areas in the corresponding combination to obtain a second difference vector in the direction of the second axis, and acquire a first projection difference vector and a second projection difference vector projected by the first difference vector and the second difference vector on the line of the predetermined orientation in the corresponding combination,
   wherein the feature calculating unit is further configured to acquire the mean value or sum of the sums of magnitudes of the first projection difference vector and the second projection difference vector associated with the at least two combinations corresponding to each of the second feature, as the second feature.

4. The apparatus according to claim 3, wherein the at least two combinations corresponding to each of the second feature can form a sequence where a deviation between the predetermined orientations of adjacent combinations is within a predetermined range, respective coverage of the areas of the adjacent combinations are close to each other, and pixels covered by the at least two combinations are not exactly the same as each other.

5. The apparatus according to claim 2, wherein the angles of the plurality of predetermined orientations relative to the first axis or the second axis range from 0 degree to 180 degree or from 0 degree to 360 degree.

6. The apparatus according to claim 5, wherein the angles between adjacent predetermined orientations of the plurality of predetermined orientations are the same.

7. The apparatus according to claim 2, wherein the angles between adjacent predetermined orientations of the plurality of predetermined orientations are the same.

8. A method of generating a classifier for discriminating object images from non-object images, comprising:
   extracting a feature vector from an input image, wherein the feature vector comprises a plurality of first candidate features, each of the first candidate features corresponds to a candidate combination of a plurality of first areas arranged in the direction of a first axis, a plurality of second areas arranged in the direction of a second axis intersecting with the direction of the first axis, and one of a plurality of predetermined orientations, and the extracting of each of the first candidate features comprises:
   acquiring a difference between sums or mean values of pixels of the plurality of first areas in the corresponding candidate combination to obtain a first difference vector in the direction of the first axis, and acquiring a difference between sums or mean values of pixels of the plurality of second areas in the corresponding candidate combination to obtain a second difference vector in the direction of the second axis;
   acquiring a first projection difference vector and a second projection difference vector projected by the first difference vector and the second difference vector on the line of the predetermined orientation in the corresponding candidate combination; and acquiring the sum of magnitudes of the first projection difference vector and the second projection difference vector as the first candidate feature; and training the classifier according to the extracted feature vectors vector.

9. An apparatus for generating a classifier for discriminating object images from non-object images, the apparatus extracting a feature vector from an input image, wherein the feature vector comprises a plurality of first candidate features, each of the first candidate features corresponds to a candidate combination of a plurality of first areas arranged in the direction of a first axis, a plurality of second areas arranged in the direction of a second axis intersecting with the direction of the first axis, and one of a plurality of predetermined orientations, and the apparatus comprising:

a difference calculating unit which with respect to each of the first candidate features, acquires a difference between sums or mean values of pixels of the plurality of first areas in the corresponding candidate combination to obtain a first difference vector in the direction of the first axis, acquires a difference between sums or mean values of pixels of the plurality of second areas in the corresponding candidate combination to obtain a second difference vector in the direction of the second axis, and acquires a first projection difference vector and a second projection difference vector projected by the first difference vector and the second difference vector on the line of the predetermined orientation in the corresponding candidate combination; and a feature calculating unit which acquires the sum of magnitudes of the first projection difference vector and the second projection difference vector as the first candidate feature; and a training unit which trains the classifier according to the extracted feature vector.

10. The apparatus according to claim 9, wherein the feature vector further comprises at least one second candidate feature, wherein each of the second candidate feature corresponds to at least two candidate combinations of a plurality of first areas arranged in the direction of the first axis, a plurality of second areas arranged in the direction of the second axis intersecting with the direction of the first axis, and one of a plurality of predetermined orientations, wherein the difference calculating unit is further configured to, with respect to each of the second candidate feature, acquire a difference between sums or mean values of pixels of the plurality of first areas in each of the at least two candidate combinations corresponding to the second candidate feature to obtain a first difference vector in the direction of the first axis, while acquire a difference between sums or mean values of pixels of the plurality of second areas in a corresponding candidate combination of the at least two candidate combinations to obtain a second difference vector in the direction of the second axis, and acquire a first projection difference vector and a second projection difference vector projected by the first difference vector and the second difference vector on the line of the predetermined orientation in the corresponding candidate combination, and wherein the feature calculating unit is further configured to acquire the sum of magnitudes of the first projection difference vector and the second projection difference vector, the mean value or sum of sums corresponding to the at least two candidate combinations as the second candidate feature.

11. The apparatus according to claim 10, further comprising:

a searching unit which searches the candidate combinations corresponding to the first candidate features for at least one set, wherein each of the set includes at least two of the candidate combinations meeting the following condition: the candidate combinations can form a sequence where a deviation between the predetermined orientations of adjacent candidate combinations is within a predetermined range, respective coverage of the areas of the adjacent candidate combinations are close to each other, and pixels covered by different candidate combinations are not exactly the same as each other; and a filtering unit which regards the candidate combinations in each of the set as candidate combinations corresponding to one of the second candidate feature.

12. The apparatus according to claim 11, further comprising:

an evaluation unit which evaluates discriminating capability of the second candidate feature by acquiring the second candidate feature corresponding to each of the set through the following manner:

with respect to each candidate combination of the set, acquiring a difference between sums or mean values of pixels of the plurality of first areas in the candidate combination to obtain a first difference vector in the direction of the first axis, and acquiring a difference between sums or mean values of pixels of the plurality of second areas in the candidate combination to obtain a second difference vector in the direction of the second axis;

acquiring a first projection difference vector and a second projection difference vector projected by the first difference vector and the second difference vector on the line of the predetermined orientation in the candidate combination; and acquiring the sum of magnitudes of the first projection difference vector and the second projection difference vector; and acquiring the mean value or sum of the sums corresponding to the candidate combinations of the set as the second candidate feature, wherein the filtering unit is further configured to exclude the set from the searched set if the discriminating capability of the second candidate feature does not meet a predetermined requirement.

13. The apparatus according to claim 10, further comprising:

a searching unit which generates at least one set from the candidate combinations corresponding to the first candidate features, wherein each of the set includes at least two of the candidate combinations;

an evaluation unit which evaluates discriminating capability of the second candidate feature by acquiring the second candidate feature corresponding to each of the set through the following manner:

with respect to each candidate combination of the set, acquiring a difference between sums or mean values of pixels of the plurality of first areas in the candidate combination to obtain a first difference vector in the direction of the first axis, and acquiring a difference between sums or mean values of pixels of the plurality of second areas in the candidate combination to obtain a second difference vector in the direction of the second axis;

acquiring a first projection difference vector and a second projection difference vector projected by the first difference vector and the second difference vector on the line of the predetermined orientation in the candidate combination; and acquiring the sum of magnitudes of the first projection difference vector and the second projection difference vector; and acquiring the mean value or sum of the sums corresponding to the candidate combinations of the set as the second candidate feature; and a filtering unit which excludes the set from the generated sets if the discriminating capability of the second candidate feature does not meet a predetermined requirement, and regards the candidate combinations in each of the sets as candidate combinations corresponding to one of the second candidate features.

14. The apparatus according to claim 9, wherein the angles of the plurality of predetermined orientations relative to the first axis or the second axis range from 0 degree to 180 degree or from 0 degree to 360 degree.

15. The apparatus according to claim 14, wherein the angles between adjacent predetermined orientations of the plurality of predetermined orientations are the same.

16. The apparatus according to claim 9, wherein the angles between adjacent predetermined orientations of the plurality of predetermined orientations are the same.

* * * * *